United States Patent
Mastrangelo

(10) Patent No.: US 9,943,856 B2
(45) Date of Patent: Apr. 17, 2018

(54) MINERAL FILLER COMPOSITIONS, METHODS FOR MAKING MINERAL FILLER COMPOSITIONS AND CARPETS MANUFACTURED FROM SAME

(71) Applicant: Shaw Industries Group, Inc., Dalton, GA (US)

(72) Inventor: John Charles Mastrangelo, Ringgold, GA (US)

(73) Assignee: Columbia Insurance Company, Omaha, NE (US)

( * ) Notice: Subject to any disclaimer, the term of this patent is extended or adjusted under 35 U.S.C. 154(b) by 531 days.

(21) Appl. No.: 14/215,906

(22) Filed: Mar. 17, 2014

(65) Prior Publication Data
US 2014/0287184 A1    Sep. 25, 2014

Related U.S. Application Data

(60) Provisional application No. 61/789,884, filed on Mar. 15, 2013.

(51) Int. Cl.
*B02C 23/00* (2006.01)
*C09C 1/02* (2006.01)
(Continued)

(52) U.S. Cl.
CPC .......... *B02C 23/00* (2013.01); *B02C 19/0056* (2013.01); *C09C 1/02* (2013.01); *C09C 1/021* (2013.01); *D06N 7/0073* (2013.01); *C01P 2004/03* (2013.01); *C01P 2004/61* (2013.01); *C01P 2004/62* (2013.01); *D06N 2205/10* (2013.01); *Y10T 428/23921* (2015.04); *Y10T 428/2982* (2015.01)

(58) Field of Classification Search
CPC ... B02C 4/44; B02C 17/1815; B02C 18/0084; B02C 19/00; B02C 23/08; C09C 1/02; C09C 1/021; D06N 2205/10
USPC .......................... 241/24, 24.13, 24.19, 24.29
See application file for complete search history.

(56) References Cited

U.S. PATENT DOCUMENTS 2,323,550 A    7/1943 Lukens
3,645,992 A    2/1972 Elston
(Continued)

FOREIGN PATENT DOCUMENTS

JP    9279482 A    4/1999
JP    3112635 B2   11/2000

OTHER PUBLICATIONS

Blackly, D.C., Polymer Latices: Science and Technology; 2nd Ed.; vol. 3; "Applications of Latices," chapter 19, Latex and Textiles, section 19.4.2, p. 361, Chapman & Hall (1997).
(Continued)

*Primary Examiner* — Faye Francis
(74) *Attorney, Agent, or Firm* — Ballard Spahr LLP

(57) ABSTRACT

Disclosed are calcium carbonate mineral filler compositions, wherein the composition has a mineral content characterized by a weight ratio of calcium to magnesium of at least 10:1, and wherein the composition is at least substantially free of calcium oxide. Also disclosed are methods for making a mineral filler composition from a renewable biological source of calcium carbonate. Also disclosed are carpets comprising the mineral filler from renewable biological source produced by the methods disclosed herein.

13 Claims, 8 Drawing Sheets

(51) Int. Cl.
*B02C 19/00* (2006.01)
*D06N 7/00* (2006.01)

(56) References Cited

U.S. PATENT DOCUMENTS

| | | |
|---|---|---|
| 3,676,280 A | 7/1972 | Sands |
| 3,810,807 A | 5/1974 | Jackson et al. |
| 4,170,658 A | 10/1979 | Skinner et al. |
| 4,279,661 A | 7/1981 | Strauch et al. |
| 4,798,081 A | 1/1989 | Hazlitt et al. |
| 4,937,299 A | 6/1990 | Ewen et al. |
| 4,942,074 A | 7/1990 | Bell et al. |
| 5,008,204 A | 4/1991 | Stehling |
| 5,026,765 A | 6/1991 | Katz et al. |
| 5,218,071 A | 6/1993 | Tsutsui et al. |
| 5,292,845 A | 3/1994 | Kawasaki et al. |
| 5,837,769 A | 11/1998 | Graafland et al. |
| 6,313,195 B1 | 11/2001 | Chiang |
| 7,045,590 B2 | 5/2006 | Bell |
| 7,584,909 B2* | 9/2009 | Vlad ................. A23J 1/08 241/2 |
| 9,370,778 B2* | 6/2016 | Snyder ................. B02C 19/005 |
| 2003/0152743 A1 | 8/2003 | Matsunaga et al. |
| 2008/0081158 A1 | 4/2008 | Winey et al. |
| 2009/0258191 A1 | 10/2009 | Peacock |
| 2009/0300982 A1 | 12/2009 | Mauldin et al. |
| 2010/0051745 A1 | 3/2010 | Jones et al. |
| 2011/0008567 A1 | 1/2011 | Weeks et al. |
| 2014/0346261 A1* | 11/2014 | Snyder ................. B02C 19/005 241/5 |

OTHER PUBLICATIONS

Cady, L.D., "The Role of Comonomer Type and Distribution in LLDPE Product Performance," SPE Regional Technical Conference, Quaker Square Hilton, Akron, Ohio, Oct. 1-2, pp. 107-119 (1985).

Randall, J.C., "A Review of High Resolution Liquid Carbon Nuclear Magnetic Resonance Characterizations of Ethylene-Based Polymers," Rev. Macromol. Chem. Phys., C29, pp. 201-317 (1989).

Wild et al., "Determination of Branching Distributions in Polyethylene and Ethylene Copolymers," Journal of Polymer Science, Poly. Phys. Ed., vol. 20, pp. 441-455 (1982).

* cited by examiner

MINERAL FILLER COMPOSITIONS, METHODS FOR MAKING MINERAL FILLER COMPOSITIONS AND CARPETS MANUFACTURED FROM SAME

CROSS-REFERENCE TO RELATED APPLICATIONS

This application claims the benefit of, and priority to, U.S. Provisional Application No. 61/789,884, filed Mar. 15, 2013, the entire disclosure of which is incorporated by reference herein in its entirety.

FIELD OF THE INVENTION

The present invention relates generally to a mineral filler composition, and methods and systems for making the mineral filler composition from a renewable source. The invention also relates to a textile containing the mineral filler composition made by the methods and systems disclosed.

BACKGROUND OF THE INVENTION

Carpet is a common floor covering used in many businesses and residences. In the conventional manufacture of carpeting, tufted pile yarns or like facings are held in place by a primary backing, and typically a secondary backing, as well as possible other layers, also associated with the carpeting. At least some of the carpet backings (particularly latex, EVA, PVC, or other polymer-based backings) use filler as an important component thereof. The standard filler that is used is a mineral filler, typically mined calcium carbonate, alone, or in combination with some other materials.

The calcium carbonate, or like mineral fillers, that are used in carpet backings are mined, and therefore have associated therewith the conventional problems associated with the mining of materials.

It is known in the art of carpet making that certain properties of a composition can be used to predict its performance in a given application. In this context, higher tensile strength values typically translates to a tendency toward higher delamination and tuft bind numbers, while higher elongations at the breaking point yields higher flexibility, and a better handling product for the installer. It can be challenging to achieve desired flexibility without compromising the strength of the carpet. In most situations, conventional carpets are capable of having either a higher tensile strength or elongation at the breaking point, mostly because the carpet, by its nature of application, has to be strong enough to provide a good delamination and higher tuft bind numbers while at the same time be flexible enough, such that it can be bent over a step, or stretched in a large room easily. If this balance is shifted toward the higher elongation at the breaking point without increase in the tensile strength and tuft bind numbers, the carpet loses its ability to hold, and can "grow" after installation.

Accordingly, there is a need to provide a mineral filler that is free of conventional problems associated with the mining of materials, particularly it is preferred to provide a renewable source of the mineral filler that can improve economic benefits and an environmental footprint of a carpet. Further, there is a need for a method of making a mineral filler composition from a renewable source that can yield a mineral filler composition suitable for use in the manufacture of new carpets, carpet tiles, and like materials. Still further, there is a need for the manufacture of carpet structures comprising a mineral filler composition prepared from a renewable source. Even further, there is a need to provide a carpet or carpet tile having an increased elongation at the breaking point which is also yields to a higher tensile strength. These needs and other needs are at least partially satisfied by aspects of the present invention.

SUMMARY OF THE INVENTION

In accordance with the purpose(s) of the invention, as embodied and broadly described herein, the invention, in one aspect, relates to a mineral filler composition comprising a calcium carbonate, wherein the composition comprises a mineral content characterized by a weight ratio of calcium to magnesium of at least 10:1, and wherein the composition is at least substantially free of calcium oxide.

In another aspect, the invention relates to a precoat composition for applying to a backing of a greige good, comprising: a latex component; and a mineral filler composition, the mineral filler composition comprising a calcium carbonate, wherein the composition comprises a mineral content characterized by a weight ratio of calcium to magnesium of at least 10:1; and wherein the mineral filler composition is at least substantially free of calcium oxide.

In yet another aspect, the invention disclosed herein, relates to a textile comprising: a primary backing with a face side and a back side; a yarn tufted into the primary backing so as to provide a carpet pile on the face side of the primary backing and loops of yarn on the back side of the primary backing; and a precoat composition applied to the back side of the primary backing, wherein the precoat composition comprises: i) a latex component; and ii) a mineral filler composition, the mineral filler composition comprising a calcium carbonate, wherein the composition comprises a mineral content characterized by a weight ratio of calcium to magnesium of at least 10:1; and wherein the mineral filler composition is at least substantially free of calcium oxide.

In yet another aspect, the invention relates to a method for making a mineral filler composition, comprising the steps of: providing a renewable biological source of calcium carbonate; heat treating the renewable biological calcium carbonate source under conditions effective to remove residual organic material; and size reducing the heat treated renewable biological calcium carbonate source to provide a particulate mineral filler composition having a predetermined particle size distribution; wherein the mineral filler composition comprising a calcium carbonate, wherein the composition comprises a mineral content characterized by a weight ratio of calcium to magnesium of at least 10:1; and wherein the composition is at least substantially free of calcium oxide.

Additional aspects of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE FIGURES

The accompanying drawings, which are incorporated in and constitute a part of this specification, illustrate exemplary aspects and together with the description, serve to explain the principles of the compositions, methods and systems disclosed herein.

DETAILED DESCRIPTION OF THE INVENTION

Figure 1:
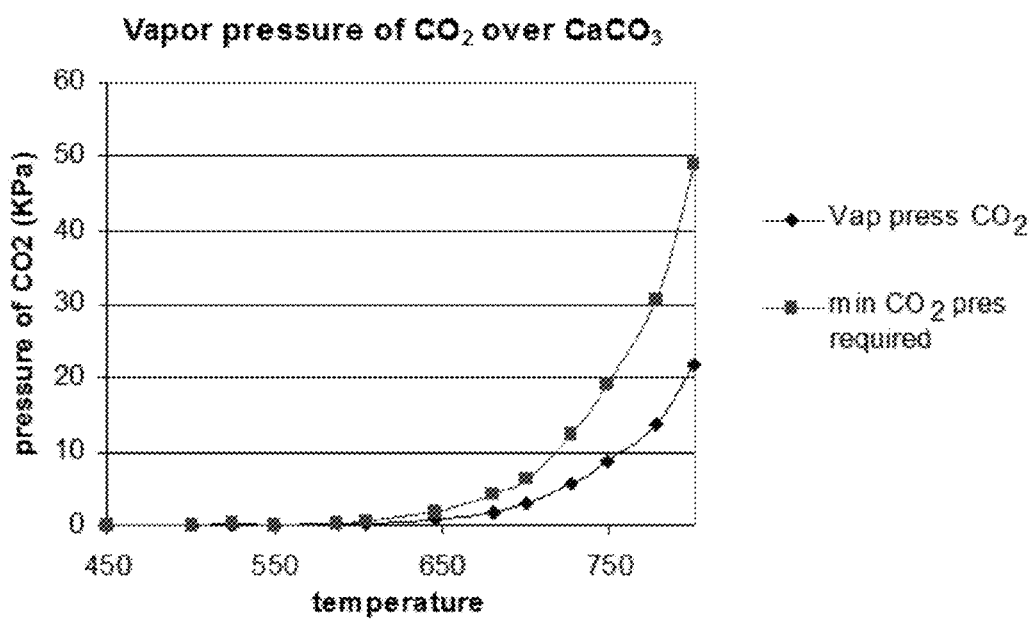
FIG. 1 is a schematic representation of a $CO_2$ vapor pressure dependence on a processing temperature.

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used herein, the singular forms "a," "an" and "the" include plural referents unless the context clearly dictates otherwise. Thus, for example, reference to a "surface" includes aspects having two or more such surfaces unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

As used herein, the term or phrase "substantially uniform particle size" refers to the particle size describing particles, wherein at least 90% of the mass of a material is made up of particles having a particle size in the range 1×-4×. In this aspect, the term refers to particles, wherein for at least 90% of the mass of material, the smallest particles are no smaller than ¼ of the large particle size. In a further aspect, the term refers to particles, wherein for at least 90% of the mass of material, the largest particles are no more than 4 times larger than the small particles.

The term "intimate contact" refers to the mechanical interaction between the bottom surface of the primary backing material and the first backing material (e.g., the adhesive backing material).

The term "substantial encapsulation" refers to the first backing material (e.g., the adhesive backing material) significantly surrounding the yarn or fiber bundles at or in immediate proximity to the interface between the back surface of the primary backing material and the adhesive backing material.

The term "substantial consolidation" refers to the overall integrity and dimensional stability of the carpet that is achieved by substantially encapsulating the yarn or fiber bundles and intimately contacting the back surface of the primary backing material with the adhesive backing material. In one aspect, a substantially consolidated carpet possesses good component cohesiveness and good delamination resistance with respect to the various carpet components.

The term "integral fusing" is used herein in the same sense as known in the art and refers to heat bonding of carpet components using a temperature above the melting point of the adhesive backing material. In this aspect, integral fusing occurs when the adhesive backing material comprises the same polymer as either the fibers or primary backing material or both. However, integral fusing does not occur when the adhesive backing material comprises a different polymer than the fibers and primary backing material. In a further aspect, by the term "same polymer," it is meant that the monomer units of the polymers are of the same chemistry, although their molecular or morphological attributes may differ. Conversely, by the term "different polymer," it is meant that, irrespective of any molecular or morphological differences, the monomer units of the polymers are of different chemistries. Thus, in accordance with the various definitions of the present invention, a polypropylene primary backing material and a polyethylene adhesive backing material would not integrally fuse because these carpet components are of different chemistries.

The term "carpet component" is used herein to refer separately to carpet fiber bundles, a primary backing material, an optional precoat layer, an adhesive backing material, an optional reinforcing layer, and an optional secondary backing material.

The term "extrusion coating" is used herein in its conventional sense to refer to an extrusion technique wherein a polymer composition usually in pellet-form is heated in an extruder to a temperature elevated above its melt temperature and then forced through a slot die to form a semi-molten or molten polymer sheet. The semi-molten or molten polymer sheet is continuously drawn down onto a continuously fed greige good to coat the backside of the greige good with the polymer composition. It should also be understood that, as used herein, extrusion coating is not limited to applying a coating to greige good but, rather, can be used to apply a composition to any desired component of a carpet construction, including for example, primary backing and/or secondary backing.

In one aspect, the term "lamination technique" is used herein in its conventional sense refer to applying adhesive backing materials to greige goods by first forming the adhesive backing material as a solidified or substantially solidified film or sheet and thereafter, in a separate processing step, reheating or elevating the temperature of the film or sheet before applying it to the back surface of the primary backing material.

The term "processing material" is used herein to refer to substances such as spin finishing waxes, equipment oils, sizing agents and the like, which can interfere with the adhesive or physical interfacial interactions of adhesive backing materials. Optionally, at least some of the processing materials can be removed or displaced by a scouring or washing technique of the present invention whereby improved mechanical bonding is accomplished.

The terms "polyester carpet" and "polyester greige goods" are used herein to mean a carpet or greige goods substantially comprised of polyester fibers, irrespective of whether the primary backing material for the carpet or greige good is comprised of polyester or some other material.

The terms "polypropylene carpet" and "polypropylene greige goods" are used herein to mean a carpet or greige goods substantially comprised of polypropylene fibers, irrespective of whether the primary backing material for the carpet or greige good is comprised of polypropylene or some other material.

The terms "nylon carpet" and "nylon greige goods" are used herein to mean a carpet or greige goods substantially comprised of polyamide (nylon) fibers, irrespective of whether the primary backing material for the carpet or greige good is comprised of polyamide (nylon) or some other material.

The term "linear" as used to describe ethylene polymers is used herein to mean the polymer backbone of the ethylene polymer lacks measurable or demonstrable long chain branches, e.g., the polymer is substituted with an average of less than 0.01 long branch/1000 carbons.

As used herein, the term "copolymer" refers to a polymer formed from two or more different repeating units (monomer residues). By way of example and without limitation, a copolymer can be an alternating copolymer, a random copolymer, a block copolymer, or a graft copolymer.

The term "homogeneous ethylene polymer" as used to describe ethylene polymers is used in the conventional sense in accordance with the original disclosure by Elston in U.S. Pat. No. 3,645,992, the disclosure of which is incorporated herein by reference, to refer to an ethylene polymer in which the co-monomer is randomly distributed within a given polymer molecule and wherein substantially all of the polymer molecules have substantially the same ethylene to co-monomer molar ratio. As defined herein, both substantially linear ethylene polymers and homogeneously branched linear ethylene are homogeneous ethylene polymers.

Homogeneously branched ethylene polymers are homogeneous ethylene polymers that possess short chain branches and that are characterized by a relatively high short chain branching distribution index (SCBDI) or relatively high composition distribution branching index (CDBI). That is, the ethylene polymer has a SCBDI or CDBI greater than or equal to 50 percent, preferably greater than or equal to 70 percent, more preferably greater than or equal to 90 percent and essentially lack a measurable high density (crystalline) polymer fraction.

The SCBDI or CDBI is defined as the weight percent of the polymer molecules having a co-monomer content within 50 percent of the median total molar co-monomer content and represents a comparison of the co-monomer distribution in the polymer to the co-monomer distribution expected for a Bernoullian distribution. The SCBDI or CDBI of polyolefins can be conveniently calculated from data obtained from techniques known in the art, such as, for example, temperature rising elution fractionation (abbreviated herein as "TREF") as described, for example, by Wild et al., Journal of Polymer Science, Poly. Phys. Ed., Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or in U.S. Pat. Nos. 4,798,081 and 5,008,204, the disclosures of all of which are incorporated herein by reference. However, the preferred TREF technique does not include purge quantities in SCBDI or CDBI calculations. More preferably, the co-monomer distribution of the polymer and SCBDI or CDBI is determined using 13C NMR analysis in accordance with techniques described, for example, in U.S. Pat. No. 5,292,845 and by J. C. Randall in Rev. Macromol. Chem. Phys., C29, pp. 201-317, the disclosures of which are incorporated herein by reference.

The terms "homogeneously branched linear ethylene polymer" and "homogeneously branched linear ethylene/α-olefin polymer" means that the olefin polymer has a homogeneous or narrow short branching distribution (i.e., the polymer has a relatively high SCBDI or CDBI) but does not have long chain branching. That is, the linear ethylene polymer is a homogeneous ethylene polymer characterized by an absence of long chain branching. Such polymers can be made using polymerization processes (e.g., as described by Elston in U.S. Pat. No. 3,645,992) which provide a uniform short chain branching distribution (i.e., homogeneously branched). In his polymerization process, Elston uses soluble vanadium catalyst systems to make such polymers, however others, such as Mitsui Petrochemical Industries and Exxon Chemical Company, have reportedly used so-called single site catalyst systems to make polymers having a homogeneous structure similar to polymer described by Elston. Further, U.S. Pat. No. 4,937,299 to Ewen et al. and U.S. Pat. No. 5,218,071 to Tsutsui et al., the disclosures of which are incorporated herein by reference, disclose the use of metallocene catalysts for the preparation of homogeneously branched linear ethylene polymers. Homogeneously branched linear ethylene polymers are typically characterized as having a molecular weight distribution, Mw/Mn, of less than 3, preferably less than 2.8, more preferably less than 2.3.

The terms "homogeneous linearly branched ethylene polymer" or "homogeneously branched linear ethylene/α-olefin polymer" do not refer to high pressure branched polyethylene which is known to those skilled in the art to have numerous long chain branches. In one aspect, the term "homogeneous linear ethylene polymer" generically refers to both linear ethylene homopolymers and to linear ethylene/α-olefin interpolymers. For example, a linear ethylene/α-olefin interpolymer possess short chain branching and the α-olefin is typically at least one C3-C20 α-olefin (e.g., propylene, 1-butene, 1-pentene, 4-methyl-1-pentene, 1-hexene, and 1-octene).

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term carpet is used to generically include broadloom carpet, carpet tiles, and even area rugs. To that "broadloom carpet" means a broadloom textile flooring product manufactured for and intended to be used in roll form. "Carpet tile" denotes a modular floor covering, conventionally in 18"×18," 24"×24" or 36"×36" squares, but other sizes and shapes are also within the scope of the present invention.

The present invention may be understood more readily by reference to the following detailed description of preferred embodiments of the invention and the examples included therein and to the Figures and their previous and following description.

Mineral Filler Compositions

As summarized above, an aspect of the invention provides a process for the manufacture of a mineral filler composition from a renewable calcium carbonate containing resource. The renewable calcium carbonate containing source can be a biological calcium carbonate containing source, including calcium carbonate sources obtained from biological organisms. More specifically, renewable biological calcium carbonate containing resources can include, for example, poultry egg shells such as chicken egg shells. In further aspects, the renewable calcium carbonate containing resource can include sea shells, or mollusk shells such as, for example, oyster shells. In still further aspects, the renewable calcium carbonate containing resource can be any combination of the aforementioned resources. Exemplarily sources used to provide egg shells include poultry farms, chicken hatcheries, commercial egg cooking operations, or oyster shucking facilities.

The process generally comprises heat treating a selected calcium carbonate source or combination of calcium carbonate sources under conditions effective to remove any residual organic material that may be present in the calcium carbonate source, such as for example, proteins or residual animal tissue. The heat treatment step can also provide the benefit of ensuring no objectionable odors are present in the final mineral filler material. The heat treated calcium carbonate source can then be size reduced to provide a particulate mineral filler composition having any desired predetermined particle size distribution.

Optionally, prior to the heat treatment step a selected calcium carbonate source can be homogenized to provide a starting material with substantially uniform particle size as defined above. To that end, in an exemplary and non-limiting aspect, an optional homogenization step can comprise forming a slurry of the calcium carbonate source in water and then subjecting the formed slurry to a size reduction step such that the calcium carbonate source present in the formed slurry is of a substantially uniform particle size. This can be accomplished, for example, by feeding the slurry in at least one pass through a maceration pump, a conventional impact mill or other similar device. Following homogenization, the slurry can then be mechanically dewatered or otherwise substantially dried to form a cake. This can be accomplished, for example, by using a mechanical press, a centrifuge, or other similar devices.

As noted above, following any optional homogenization and dewatering step, the calcium carbonate source is then heat treated under conditions effective to remove any residual organic material that may be present. The residual organic material can include, but is not limited to, shell membranes, residual liquids, proteins and solids. In one aspect the heat treatment can be accomplished in a static oven. In a further aspect, the heat treatment can be accomplished in a directly heated rotary furnace such as a rotary kiln. For example, a homogenized and dewatered feed slurry or cake can be conveyed to a rotary kiln using a weigh-belt feeder. In another aspect, the heat treatment can be accomplished in an indirectly heated rotary furnace such as calciner. In yet another aspect, the heat treatment can be accomplished in a fluidized bed combustor, or in any other heat treatment device known in the art. It should be appreciated that the heat treatment can occur in a continuous or a batch manner.

Heat treatment conditions effective to remove any residual organic material comprise heating the calcium carbonate source at a temperature in the range of from about 250° C. to about 750° C., including for example, at temperatures of 275° C., 300° C., 325° C., 350° C., 375° C., 400° C., 425° C., 450° C., 475° C., 500° C., 525° C., 550° C., 575° C., 600° C., 625° C., 650° C., 675° C., 700° C., and 725° C. In further aspects, heat treatment conditions effective to remove any residual organic material comprise heating the calcium carbonate source at any temperature within any range of temperatures derived from the above exemplified temperature values. For example, the heat treatment conditions can comprise heating at a temperature in the range of from 450° C. to 700° C., from 500° C. to 750° C., or from 550° C. to 750° C. In still further aspects, the conditions effective to remove residual organic material comprise treating the calcium carbonate source at a temperature of at least 500° C., at least 600° C., or at least 700° C.

As one of ordinary skill in the art will appreciate, calcium carbonate can decompose to form calcium oxide when subjected to relatively high temperatures. The exact temperature at which thermal decomposition will take place depends upon the nature of the environment in which heating occurs. For example, when heated under a carbon dioxide poor atmospheric environment, decomposition can begin at temperatures above about 650° C. However, when heating occurs in an environment relatively rich in carbon dioxide ($CO_2$) gas, thermal decomposition may not occur until higher temperatures, for example, temperatures exceeding about 650° C. To that end, the presence of even minor amounts of calcium oxide in the mineral filler composition is not desirable in some aspects. For example, when used in a water based system, calcium oxide can react with water to form calcium hydroxide, a basic substance that is not beneficial in certain water-based systems. Accordingly, it is important in some aspects of the invention to control the heat treatment conditions in a manner that provides a mineral filler composition that is at least substantially free of any calcium oxide. As used herein, at least substantially free of any calcium oxide refers to and includes aspects where the mineral filler composition is, on a weight percent basis, at least 85% free, at least 90% free, at least 95% free, at least 97% free, at least 98% free, at least 99% free, at least 99.5% free, and even 100% free of calcium oxide.

According to aspects of the invention, it can be desirable for the heat treatment conditions to comprise heating the calcium carbonate source at temperatures exceeding 750° C., including for example temperatures of at least 800° C. In order to prevent decomposition of the calcium carbonate to calcium oxide under this conditions the heat treatment can be maintained in an environment having a partial pressure of carbon dioxide in excess of the pressure of carbon dioxide exerted by calcium carbonate during its decomposition to calcium carbonate and calcium oxide. This can prevent the calcium carbonate from decomposing to calcium oxide and carbon dioxide.

For example, and without limitation, heat treatment that occurs in an atmosphere having a partial pressure of $CO_2$ in at least 2.26 excess of the pressure of $CO_2$ exerted by $CaCO_3$ during the decomposition can prevent CaO formation. In another aspect, an atmosphere that has a partial pressure of about 55 KPa of $CO_2$, can allow the heat treatment to occur at 800° C. without causing the decomposition of $CaCO_3$. In another aspect, an atmosphere that has a $CO_2$ partial pressure of about 22 KPa, can allow the heat treatment to occur at 750° C. with the same retarding effect. In a further aspect, an atmosphere that has a $CO_2$ partial pressure of about 10 KPa, can allow the heat treatment to occur at 700° C. with the same retarding effect.

It can be calculated that, in regular breathable atmospheric air, calcination at a temperature above 600° C. can result in decomposition of calcium carbonate to calcium oxide and carbon dioxide. However, it can also be calculated that if a partial pressure of carbon dioxide in the atmosphere of the heating environment is maintained at greater than the ambient concentration of carbon dioxide (which is approximately 35 Pa) then a higher calcination temperature can be employed without the calcium carbonate decomposing. The calculations illustrated in FIG. 1 therefore indicate that maintaining an atmosphere during calcination that has a partial pressure of carbon dioxide at least about 2.26 times in excess of the pressure of carbon dioxide exerted by calcium carbonate during its decomposition can prevent the calcium carbonate from decomposing. For example, as shown in FIG. 1, if 55 KPa of carbon dioxide is maintained over calcium carbonate during heating at about 800° C. then it will not decompose. Further, at 750° C. a carbon dioxide partial pressure of about 22 KPa will have the same retarding effect. Still further, at 700° C. a carbon dioxide partial pressure of 10 KPa will prevent decomposition. It should also be noted and understood that exhaust from combustion of natural gas contains carbon dioxide at an approximate pressure of about 6-12 KPa. Natural gas likewise has about 2 to 3% oxygen. Thus, a calcium carbonate source heated in an atmosphere rich in carbon dioxide, such as that provided in a calciner directly heated by natural gas combustion should not decompose if the heating conditions do not exceed a temperature of about 700° C.

Different analytical tests have been developed that are suitable for real time or near real time monitoring of the calcium carbonate source during heat treatment. To that end, a sufficient duration of the heating step and appropriate temperature of the heating conditions can be determined by monitoring results of analytical tests which indicate whether or not malodors are no longer present and whether the heat treated material is free of calcium oxide. For example, a determination of the pH of an aqueous slurry containing the heat treated calcium carbonate source can be used to determine any presence of calcium oxide in the material. The solubility of calcium carbonate and calcium hydroxide in water are about 1.5 and 1.7 g/liter, respectively, when measured at ambient or room temperature. The pH of a saturated calcium carbonate slurry is less than 10, typically about 9.5. Calcium oxide reacts rapidly with water to produce calcium hydroxide. The pH of a saturated slurry of calcium hydroxide is greater than 12, typically about 12.4. Thus, even a relatively small amount of calcium oxide present in a relatively large amount of calcium carbonate will result in a slurry having a pH of at least about 12 or greater while calcium carbonate at least substantially free of any calcium oxide will have a slurry pH less than or equal to about 10.

The following is an exemplary testing standard that has been developed to monitor the pH of a heat treated calcium carbonate source. Specifically, if 129 grams of calcined calcium carbonate source, such as egg shells, is slurried in 1 liter of water and if about 1%, or 1.29 g of the material is present as calcium oxide, then about 1.7 g of calcium hydroxide will result from reaction of the calcium oxide and water and a slurry pH greater than 12 will be obtained. Following this exemplary testing procedure, according to aspects of the invention, a slurry of the resulting particulate mineral filler composition in water exhibits a pH less than or equal to about 10. In another aspect, the pH can be in the range from about 8 to about 10, including exemplary pH ranges of about 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, and 9.9. Still further the pH of a slurry of the inventive mineral filler composition in water can be less or equal to about 10. Even further, the pH of a slurry of the inventive mineral filler composition can be any pH within a range of pH derived from the above values. For example, the pH can be the range of from about 9.1 to about 10, about 9.4 to about 10, or even 9.5 to about 10.

An ultraviolet (UV) absorption measurement has also been developed to assist in determining if a renewable calcium carbonate source heat treated under any given set of conditions can be considered odor free. Specifically, it has been determined that the presence of contaminants which can result in an undesirable odor, often characterized as a "smoky" smell, can be quantified by an analysis of the UV absorption spectrum of an isopropanol extract of a heat treated renewable calcium carbonate source. To that end, the following exemplary and non-limiting test procedure has been developed. First, using a 50 ml graduated cylinder 40 ml of isopropanol can be added to 10.0 g of sample calcined material (either flake or finely ground). This mixture can then be shaken or mechanically stirred for about 10 minutes. The slurry can then be filtered through paper to remove most solids. The resulting solution can then be filtered using a 0.2 µm syringe filter to remove cloudiness. Using a pipette, collect 20.0 ml of the syringe filtered solution and allow the extract/filtered liquid to evaporate until less than 5 ml remains. Then bring the volume to exactly 5.0 ml with isopropanol as needed. Following the same procedure, obtain a similar 5 ml sample of extract/filtered solution from a confirmed "odorless" material for use as control comparison sample and measure the UV absorption at 290 nm for this control sample. Next, measure the UV absorbance at 290 nm for the sample material under evaluation and compare to the absorbance measured for the confirmed odorless sample. If the absorbance at 290 nm is greater than that measured for the control, either additional heating time or higher temperatures are needed to completely remove any malodor. If the measured absorbance is equal to or less than that of the control sample, the material is likely odor free. This can also be verified by an additional sniff test. While somewhat subjective, and not viable until well after calcining is completed, another test of an "odor free" state can occur when a manufacture filler composition is formulated into an end use product and stored in a closed environment.

The heat treated calcium carbonate source can then be size reduced to provide a resulting particulate mineral filler composition having any desired predetermined particle size distribution. The size reduction to a desired particle size distribution can be accomplished by any conventionally known grinding device for providing particulate material. For example, some exemplary non-limiting grinding techniques include impact mills, ball mills, roller mills, attrition mills, and jet mills. Further, the mill can be equipped with a particle size classifier for controlling what particles are suitable for final use and which particles are too large to be used in a resulting filler composition. Such a particle size classifier can be integral to the mil (i.e. an air classified mill) or can be provided as a separate (set) of unit operations.

The mineral filler can be provided in particulate form, either before or after the optional size reduction referred to above. Particulate forms of the mineral material can have any desired particle size distribution characteristics. For example, in one aspect, the particle size distribution characteristics can be selected to replicate particle size distribution characteristics of any other conventional mineral filler material. Exemplary particle size distribution characteristics to be replicated can include predetermined values of $D_{(n)}$, where (n) represents a mass percentage such as 5%, 10%, 15%, 20%, 25%, 30%, 35%, 40%, 45%, 50%, 55%, 60%, 65%, 70%, 75%, 80%, 85%, 90%, 95%, or 100%. The value of $D_{(n)}$ thus represents the particle size of which (n) percentage of the mass is finer than. For example, the quantity $D_{(100)}$ represents the particle size of which 100% of a mass is finer than. The quantity $D_{(75)}$ represents the particle size of which 75% of a mass is finer than. The quantity $D_{(50)}$ is the median particle size of a mass for which 50% of the mass is finer than. The quantity $D_{(25)}$ represents the particle size of which 25% of a mass is finer than. The quantity $D_{(10)}$ represents the particle size of which 10% of a mass is finer than.

In exemplary and non-limiting aspects, the value of $D_{(100)}$ can be less than 80 µm, 79 µm, 78 µm, 77 µm, 76 µm, 75 µm, 74 µm, 73 µm, 72 µm, 71 µm, 70 µm, 69 µm, 68 µm, 67 µm, 66 µm, 65 µm, 64 µm, 63 µm, 62 µm, 61 µm, 60 µm, 59 µm, 58 µm, 57 µm, 56 µm, 55 µm, 54 µm, 53 µm, 52 µm, 51 µm, 50 µm, 49 µm, 48 µm, 47 µm, 46 µm, or 45 µm. $D_{(100)}$ can also be greater than 40 µm, 41 µm, 42 µm, 43 µm, 44 µm, 45 µm, 46 µm, 47 µm, 48 µm, 49 µm, 50 µm, 51 µm, 52 µm, 53 µm, 54 µm, 55 µm, 56 µm, 57 µm, 58 µm, 59 µm, 60 µm, 61 µm, 62 µm, 63 µm, 64 µm, or 65 µm. Still further, $D_{(100)}$ can be a value within a range of any two $D_{(100)}$ values provided above.

In one aspect, exemplary values for $D_{(75)}$ can be less than 70 µm, 69 µm, 68 µm, 67 µm, 66 µm, 65 µm, 64 µm, 63 µm, 62 µm, 61 µm, 60 µm, 59 µm, 58 µm, 57 µm, 56 µm, 55 µm, 54 µm, 53 µm, 52 µm, 51 µm, 50 µm, 49 µm, 48 µm, 47 µm, 46 µm, 45 µm, 44 µm, 43 µm, 42 µm, 41 µm, 40 µm, 39 µm, 38 µm, 37 µm, 36 µm, 35 µm, 34 µm, 33 µm, 32 µm, 31 µm, 30 µm, 29 µm, 28 µm, 27 µm, 26 µm, 25 µm, 24 µm, 23 µm, 22 µm, 21 µm, or 20 µm. $D_{(75)}$ can also be greater than 20 µm, 21 µm, 22 µm, 23 µm, 24 µm, 25 µm, 26 µm, 27 µm, 28 µm, 29 µm, 30 µm, 31 µm, 32 µm, 33 µm, 34 µm, 35 µm, 36 µm, 37 µm, 38 µm, 39 µm, 40 µm, 41 µm, 42 µm, 43 µm, 44 µm, 45 µm, 46 µm, 47 µm, 48 µm, 49 µm, 50 µm, 51 µm, 52 µm, 53 µm, 54 µm, 55 µm, 56 µm, 57 µm, 58 µm, 59 µm, 60 µm, 61 µm, 62 µm, 63 µm, 64 µm, or 65 µm. Still further, $D_{(75)}$ can be a value within a range of any two $D_{(75)}$ values provided above.

In one aspect, exemplary values for $D_{(50)}$ can be less than 45 µm, 44 µm, 43 µm, 42 µm, 41 µm, 40 µm, 39 µm, 38 µm, 37 µm, 36 µm, 35 µm, 34 µm, 33 µm, 32 µm, 31 µm, 30 µm, 29 µm, 28 µm, 27 µm, 26 µm, 25 µm, 24 µm, 23 µm, 22 µm, 21 µm, 20 µm, 19 µm, 18 µm, 17 µm, 16 µm, 15 µm, 14 µm, 13 µm, 12 µm, 11 µm, 10 µm, 9 µm, 8 µm, 7 µm, 6 µm, or even 5 µm. Alternatively, exemplary values for $D_{(50)}$ can also be greater than 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, or even 20 µm. Still further, $D_{(50)}$ can be a value within a range of any two $D_{(50)}$ values provided above. In one aspect, the composition has a particle size distribution characterized by a $D_{(100)}$ less than 74 micron and $D_{(50)}$ less than about 44 micron. In a further aspect, the composition has a particle size distribution characterized by a median particle size $D_{(50)}$ in the range from about 7 to about 11 microns.

Exemplary values for $D_{(25)}$ can be less than 10 μm, 9 μm, 8 μm, 7 μm, 6 μm, 5 μm, 4 μm, 3 μm, 2 μm, or even 1 μm. Alternatively, exemplary values for $D_{(25)}$ can also be greater than 1 μm, 2 μm, 3 μm, 4 μm, 5 μm, 6 μm, 7 μm, 8 μm, 9 μm, or even 10 μm. Still further, $D_{(25)}$ can be a value within a range of any two $D_{(25)}$ values provided above. Exemplary values for $D_{(10)}$ can be less than 2 μm, 1.5 μm, 1 μm, or even 0.5 μm. Alternatively, exemplary values for $D_{(10)}$ can also be greater than 0.5 μm, 1 μm, 1.5 μm, or even 2 μm. Still further, $D_{(10)}$ can be a value within a range of any two $D_{(10)}$ values provided above.

In an alternative aspect, the particle size distribution of the mineral filler composition can be characterized by conventional wet screen test methods. For example, in one aspect, the mineral filler composition can comprise a particle size distribution that, when characterized utilizing a 200 mesh screen, results in 100% of particles passing through. A 200 mesh screen will retain particles having diameters larger than 74 microns and thus, according to this aspect, 100 weight % of the mineral filler composition is comprised of particles sizes smaller than 74 microns. In another aspect, the mineral filler composition can comprise a particle size distribution that, when characterized utilizing a 325 mesh screen, results in 50 weight % of the starting mass of particulate material being passed through the 325 mesh screen. A 325 mesh screen will retain particles having diameters larger than 44 microns and thus, according to this aspect, 50 weight % of the mineral filler composition is comprised of particles sizes smaller than 44 microns. In still another aspect, the mineral filler composition exhibits both the 100 weight % 200 mesh and 50 weight 325 mesh characteristics described above.

While it is expected that separate heat treating and particle size reduction steps will be most practical it is possible that heat treating and particle size reduction can be accomplished in a single step. Such a unit operation might take the form of a mill where the material is size reduced for several minutes while being simultaneously heated. For example, an air swept ball mill where the sweep air is greater than or equal to 500° C. can be used.

When size reduction is complete, the material can then be packaged for transport or used immediately. If the final step of the process involves heating the material then it may be necessary to cool the hot product. Cooling of the product should not be done in a way which results in the product getting wet with water since carpet latex formulations might not include water.

As described in more detail below, the inventive mineral filler composition provides several advantages over conventional mined $CaCO_3$ filler compositions. These advantageous properties, without wishing to be bound by theory, are believed to be due to the compositional differences, such as, for example, the mineral content between the inventive filler and conventional mined filler compositions. Typically, conventional mined calcium carbonate containing filler compositions contain a significant amount of magnesium. The magnesium can be present, for example, in the form of magnesium carbonate. To that end, conventional mined calcium carbonate sources can contain up to nearly 16 weight percent of Mg relative to the total quantifiable metal composition whereas the conventional mined filler compositions contain about 81 weight % of Ca relatively to the total quantifiable metal composition.

In contrast, according to aspects of the present invention, the inventive filler composition can comprise at least 85 weight % of Ca and less than 15 weight % of Mg relatively to the total quantifiable metal composition. For example, in one aspect, the Ca content in the inventive filler composition accounts for 85 to 100 weight % of the quantifiable metal composition, including exemplarily values of 86, 87, 88, 89, 90, 91, 92, 93, 94, 95, 96, 97, 98, and 99 weight % of the quantifiable metal composition. In a further aspect, the inventive filler composition does not comprise Mg. In a yet further aspect, the inventive filler composition is substantially free of magnesium. In an even further aspect, the Mg content in the inventive filler composition is at least less than 15 weight % of the quantifiable metal composition. In a yet further aspect, the Mg content in the inventive filler composition is less than 14, 13, 12, 11, 10, 9, 8, 7, 6, 5, 4, 3, 2, and less than 1 weight % of the quantifiable metal composition.

In one aspect, the inventive mineral composition comprising a renewable source can be further differentiated from conventional mined filler compositions by determining a renewable carbon content. According to this aspect, ASTM D6866, based on the principles of radiocarbon dating and measuring of a ratio of $^{14}C$ to $^{12}C$ isotopes, can be used to determine a percentage of renewable carbon content in the inventive filler composition versus a percentage of fossil carbon content in conventional mined filler compositions. As one of ordinary skill in the art can appreciate, the inventive filler composition comprising a renewable source will have a higher ratio of $^{14}C$ to $^{12}C$ isotopes than conventional mined filler compositions comprising a fossil carbon.

Precoat Compositions

As summarized above, the mineral filler compositions of the present invention can be used as fillers in any end use application where a conventional calcium carbonate or other mineral filler is typically used. For example, the disclosed mineral filler compositions are particularly well suited for use as fillers in the manufacture of textile floor coverings, including for example, tufted carpets, needle-punched carpets, hand woven carpets, broadloom carpets, carpet tiles, and even area rugs. More specifically, and without limitation, in the manufacture of such textile floor coverings the disclosed mineral filler compositions can be used as filler components in aqueous latex precoat compositions, latex adhesive compositions, polymeric adhesive backings, polymeric secondary backings, and foamed backings and pads. In one aspect, the reclaimed mineral filler composition can be reused in another material or process. For example, materials other than carpeting materials that typically use calcium carbonate as a mineral filler include, without limitation, roofing materials, road paving materials, awnings, and tarps.

As noted above, the disclosed mineral filler compositions are well suited for use as an improved filler in one or more component parts of a textile floor covering, including for example tufted carpets, needle-punched carpets, hand woven carpets, broadloom carpets, carpet tiles, and even area rugs. To that end, in an exemplary aspect, the disclosed mineral filler compositions are well suited for use as filler in a precoat composition applied to a surface of a greige good. As one of ordinary skill in the art will appreciate, a greige good refers to the combination of a tufted, woven or needle punched yarn and a primary backing material without the application of any subsequent adhesive backing material or secondary backing material. Greige goods become finished carpet with the application of an adhesive backing material and an optional secondary backing material to the back side of the primary backing material. Finished carpet can be prepared as broad-loomed carpet in rolls, typically 6 or 12 feet wide. Alternatively, finished carpet can be prepared as carpet tiles, which can be any size and shape but are typically 18 inches square, 24 inches square, 36 inches square, 50 cm, and 60 cm square.

Figure 2:
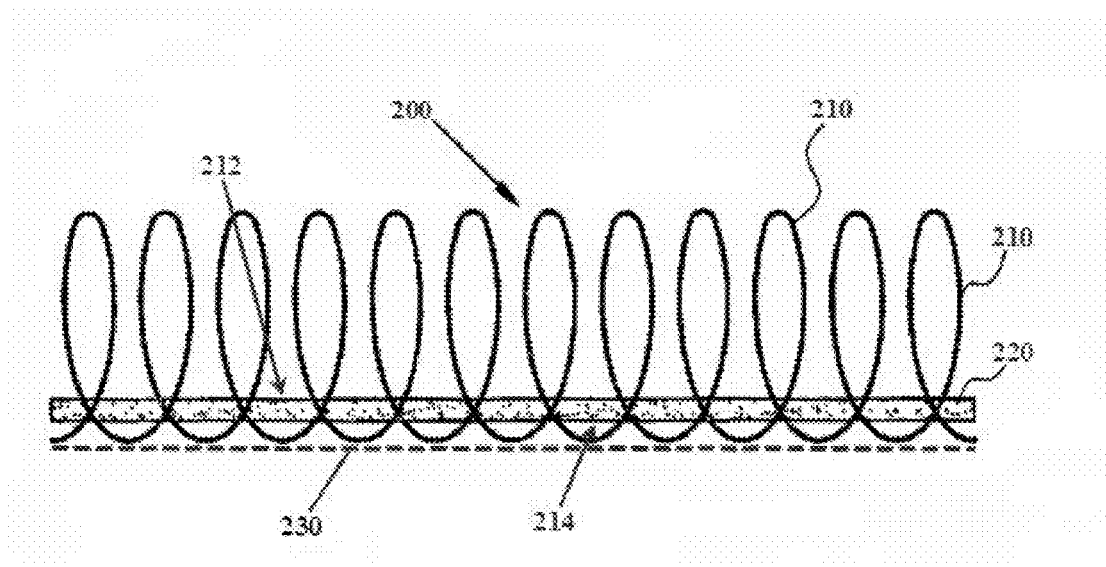
FIG. 2 shows an illustration of an exemplary greige good.

With reference to FIG. 2, an exemplary greige good 200 is shown. To prepare the greige good, a face yarn 210 can be tufted, woven, or needle punched into a face surface or top surface 212 of a primary backing 220 such that a plurality of carpet fibers penetrate a back surface or bottom surface 214 of the primary backing and protrude therefrom the face or top surface of the primary backing. The tufting, weaving or needle punching can be conducted in any manner known to be suitable to one of ordinary skill in the art which will not be discussed in detail herein.

Whether a tufted greige good, a woven, or needle punched face fabric is used, the carpet fibers can comprise face yarns can be made from synthetic fibers such as, for example and without limitation, nylon, polyolefins, polyamides, acrylics, polyesters, polyethylene terephthalate (PET), polytrimethylene terephthalate (PTT), polyethylene, and polypropylene. Still further, the face yarns can be comprised of natural fibers such as cellulose fibers, cotton fibers, wool fibers, viscose, and combinations thereof. In a particularly preferred aspect, the face yarns are comprised of polypropylene. In another preferred aspect, the face yarns are comprised of nylon fibers. To fix the yarn to the primary backing, a precoat layer 230 can first be applied to the backside of the greige good.

The precoat material can, for example, be applied as an aqueous based precoat composition. The aqueous based precoat composition can added as a dispersion or as an emulsion. In an exemplary aspect, an emulsion can be made from various polymer materials such as, for example and without limitation, polymers of ethylene acrylic acid (EAA), ethylene vinyl acetate (EVA), polypropylene or polyethylene (e.g., low density polyethylene (LDPE), linear low density polyethylene (LLDPE) or substantially linear ethylene polymer, or mixtures thereof). It is further contemplated that the precoat material can be selected from a group comprising, without limitation, an EVA hotmelt, a VAE emulsion, carboxylated styrene-butadiene (XSB) latex copolymer, a SBR latex, a butadiene methyl methacrylate latex (BDMMA latex), an acrylic latex, an acrylic copolymer, a styrene copolymer, butadiene acrylate copolymer, a polyolefin hotmelt, polyurethane, polyolefin dispersions and/or emulsions, and any combination thereof.

The precoat composition can optionally further comprise one or more flame retardants. Exemplary flame retardants that can be incorporated into the optional precoat layer include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the precoat and the selection of such amount will depend, in part, upon the particular flame retardant used, as well as the desired level of flame retardance to be achieved in the second generation carpet being manufactured. Such amounts can be readily determined through no more than routine experimentation.

In still a further aspect, the precoat can contain other optional additives and ingredients. For example, a surfactant can be included to aid in keeping the polyolefin particles at least substantially dispersed. Suitable surfactants can include, for example and without limitation, nonionic, anionic, cationic and fluorosurfactants. Preferably, the surfactant is present in an amount between about 0.01 and about 5 weight percent based on the total weight of the emulsion or dispersion. More preferably, the surfactant is anionic. The precoat can optionally comprise a thickener, a defoaming agent, and/or a dispersion enhancer. In this aspect, the thickener helps to provide a suitable viscosity to the dispersion. For example, the thickener can exemplarily comprise sodium and ammonium salts of polyacrylic acids and best present in an amount between about 0.1 and about 5 weight percent based on the total weight of the dispersion. The defoaming agent can, without limitation, be a non-silicone defoaming agent and is present in an amount between about 0.01 and about 5.0 weight percent based on the total weight of the dispersion. An exemplified dispersion enhancer can be a fumed silica that acts as a compatibilizer for the dispersion, which allows for the use of larger polyolefin particles. Preferably, the fumed silica is present at between about 0.1 and about 0.2 weight percent based on the total weight of the dispersion.

In still another aspect, the precoat composition comprises the calcium carbonate filler compositions disclosed herein and obtained from renewable sources as described above. In addition, the precoat composition can also optionally comprise one or more additional filler materials. Exemplary and non-limiting fillers that can be incorporated into the precoat composition of the present invention can include calcium carbonate, fly ash, residual by products from the depolymerization of Nylon 6 (also referred to as ENR co-product), recycled calcium carbonate (e.g., reclaimed calcium carbonate), aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof, in addition to the mineral materials present in the mineral filler composition discussed above.

In one aspect, the precoat composition comprises the inventive calcium carbonate filler composition disclosed herein in an amount between about 10 weight percent of the total composition to about 90 weight percent of the total composition, including exemplarily amounts of about 15 weight percent, 20 weight percent, 25 weight percent, 30 weight percent, 35 weight percent, 40 weight percent, 45 weight percent, 50 weight percent, 55 weight percent, 60 weight percent, 65 weight percent, 70 weight percent, 75 weight percent, 80 weight percent, and 85 weight percent of the total composition. Still further, the calcium carbonate filler composition disclosed herein can be present in any amount within a range derived from the above values. For example, the calcium carbonate filler composition can be present in an amount from about 20 weight percent to about 85 weight percent of the total composition, 40 weight percent to about 75 weight percent of the total composition, or even 65 weight percent to about 75 weight percent of the total composition.

The precoat can be applied to the back side of the greige good in various ways. For example, the dispersion can be applied directly, such as with a roll over roller applicator, or a doctor blade. Alternatively, the precoat can be applied indirectly, such as with a pan applicator. It is contemplated that the amount of pre coat applied and the concentration of the particles in the precoat can be varied depending on the desired processing and product parameters. In one example, the amount of dispersion applied and the concentration of the particles are selected so as to apply between about 4 and about 12 ounces per square yard (OSY) of carpet. In one aspect, this can be achieved by using a dispersion or emulsion containing about 50 weight percent polyolefin particles (based on the total weight of the emulsion) and applying between about 8 and about 30 OSY of the dispersion. Accordingly, it should be understood that desired application weight of the precoat will depend, at least in part, upon the presence and amount of mineral fillers and/or flame retardants in the precoat.

After application of the precoat, heat can be applied to the back side of the primary backing so as to dry, melt, and/or cure the emulsion. As a result, the loops of yarn can be at least partially fixed to the primary backing. Preferably, the heat is applied by passing the product through an oven.

As will be appreciated by one of ordinary skill in the art, tensile strength and elongation at the breaking point are two important performance properties of a latex precoat composition. A higher tensile strength typically translates into a tendency toward higher delamination strengths and higher tuft bind strengths. On balance, a higher elongation at the breaking point value will typically yield a more flexible product for the installer to handle. Therefore, an improvement in one value can come with a decrease in the other and, as such, a balance should be achieved among desired tensile strength and elongation at the breaking point values. The composition should be strong enough to provide good delamination and tuft bind values and also flexible enough that it can be bent over a step, or stretched in a large room easily. However, if the elongation at the breaking point is too high, then the carpet can have the potential to grow after it's installed and become wrinkled with wear. Surprisingly, however, and as described more fully below in the appended examples, the tensile strength and elongation at the breaking point values of precoat composition comprising the disclosed mineral filler composition exhibits beneficial improvements in both tensile strength and elongation at the breaking point values. For example, the precoat composition comprising the disclosed mineral filler composition exhibits the tensile strength values at least 2% higher than identical composition comprising the conventional mined $CaCO_3$ filler. In a further aspect, the exhibited tensile strength values are at least 5%, 10%, 15%, 20%, 25%, 30%, 35%, 40%, 45% or at least 50% higher than the tensile strength values of the composition comprising the conventional mined filler.

Still further, the precoat composition comprising the disclosed mineral filler composition exhibits the elongation at the breaking point values at least 2% higher than identical composition comprising the conventional mined $CaCO_3$ filler. In a further aspect, the exhibited elongation at the breaking point values are at least 5%, 10%, 20%, 50%, 100%, 150%, 200%, or at least 300% higher than the elongation at the breaking point values of the compositions comprising the conventional mined filler.

In one aspect, without wishing to be bound by theory, it is believed this unexpected result is due, at least in part, to the mineral content of the disclosed mineral filler compositions as compared to the mineral content of conventional mined calcium carbonate. Conventional calcium carbonate fillers obtained from mined rock sources contain both calcium carbonate and magnesium carbonate. In these mined calcium carbonate fillers the weight ratio of calcium to magnesium is typically about 5:1. In contrast, the disclosed mineral filler compositions obtained from renewable sources of calcium carbonate have a mineral content that is characterized by a relatively higher amount of calcium. For example, according to aspects of the invention, the disclosed mineral filler compositions comprise a calcium carbonate, wherein the composition comprises a mineral content characterized by a weight ratio of calcium to magnesium of at least 10:1. In further aspects, the mineral content of the mineral filler compositions are characterized by a weight ratio of calcium to magnesium that at least 15:1, 20:1, 25:1, 30:1, 35:1, 40:1, 45:1, 50:1, 55:1, 60:1, 65:1, 70:1, 75:1, 80:1, 85:1, 90:1, 95:1, 100:1, or at least 105:1. Still further, the weight ratio of calcium to magnesium can be any weight ratio within a range of weight ratios derived from the above values. For example, the weight ratio of calcium to magnesium can be in the range of from at least 10:1 to 50:1 or at least 10:1 to 100:1, or at least 10:1 to 105:1.

In another aspect, without wishing to be bound by any theory, it is believed that the difference in a mineral composition in the mineral filler composition produced from different sources can be responsible for the improved filler properties. It was found that Ca content accounts for 99 weight % of the quantifiable metal composition in the eggs shells compared to 81 weight % in mined rock. Mg content in mined rock accounts for 16 weight % of quantifiable metal composition.

Figure 7:
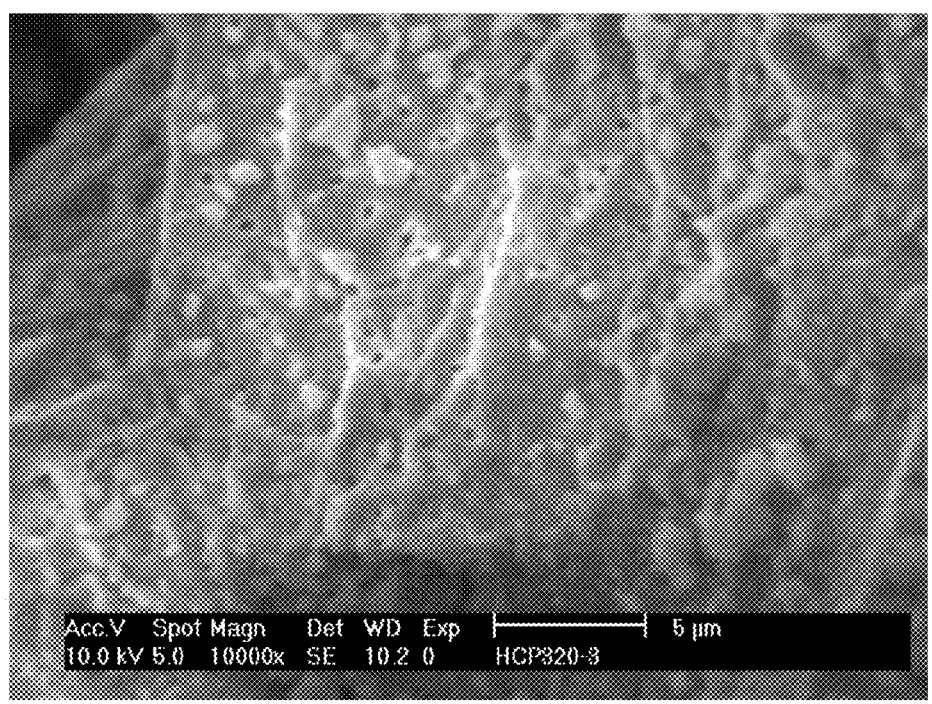
FIG. 7 shows a Scanning Electron Microscope (SEM) image of calcined egg shells.
Figure 8:
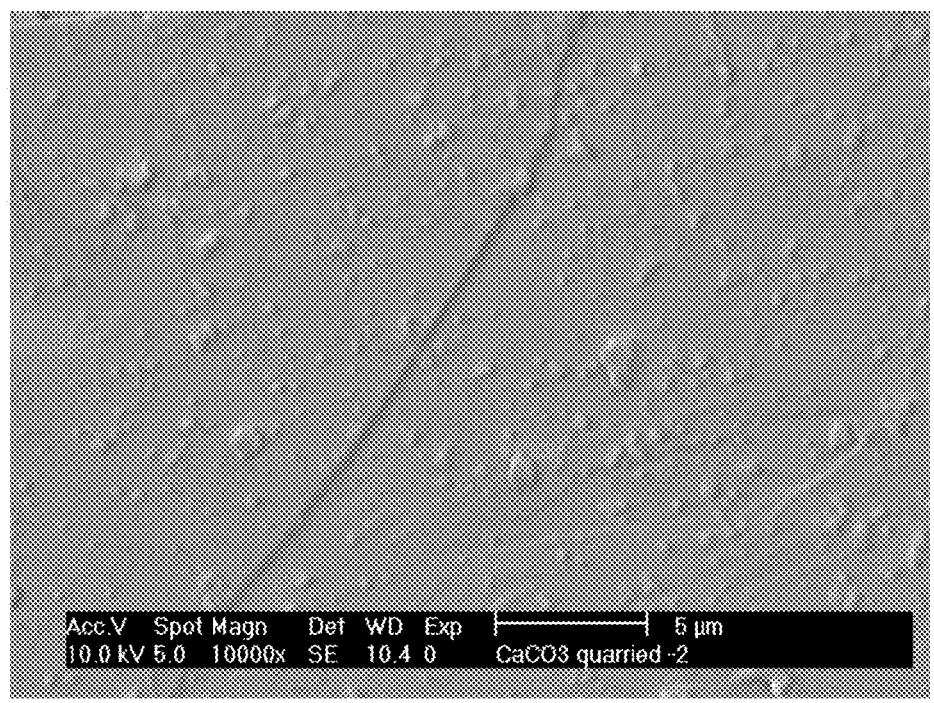
FIG. 8 shows a Scanning Electron Microscope (SEM) image of a conventional limestone.

In a further aspect, without wishing to be bound by any theory, it is believed that the difference in a porosity of the mineral filler composition produced from one or more renewable sources as described herein can be responsible for the improved filler properties. As one of ordinary skill in the art can appreciate, and as illustrated in FIG. 7 and FIG. 8, egg shells are highly porous relatively to a mined stone. Using a scanning electron microscope, it was demonstrated that an exemplary mineral filler composition produced from egg shells and according to the present invention can have a higher porosity compared to an exemplary conventional mined filler. To that end, the increase in a surface area can be responsible for the improved filler properties.

After treatment with the precoat composition, additional backing materials can be applied thereto. The additional backings can be applied by various methods with the preferred method involving the use of an extruded sheet of a thermoplastic material, onto which a conventional secondary backing can also be laminated. In particular, a molten thermoplastic material is preferably extruded through a die so as to make a sheet which is as wide as the carpet. The molten, extruded sheet is applied to the back side of the primary carpet backing. Since the sheet is molten, the sheet will conform to the shape of the loops of yarn and further serve to encapsulate and fix the loops in the primary backing.

Backing Compositions

Figure 3:
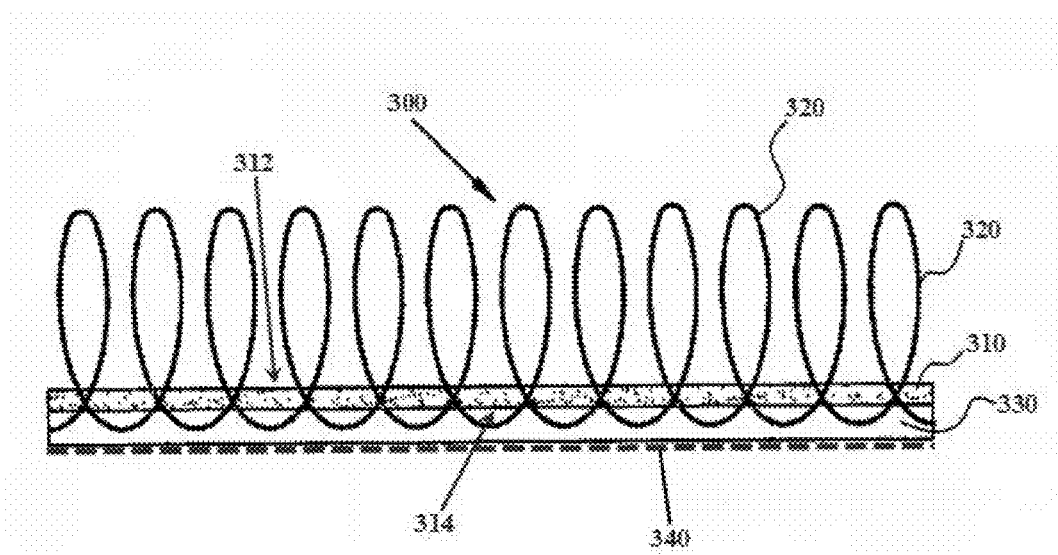
FIG. 3 shows an illustration of an exemplary tufted carpet.

In still further aspects, the disclosed mineral filler compositions of the present invention can be used in other components of a carpet, including adhesive backing compositions and secondary backing compositions. To that end, it is contemplated that the inventive mineral filler compositions can be incorporated into a component part of any carpet, including, tufted carpets, needle-punched carpets, hand woven carpets, broadloom carpets, carpet tiles, and even area rugs. However, for illustrative purposes only, in an exemplary non-limiting aspect the carpet can be a tufted broadloom carpet or carpet tile 300 as exemplified in FIG. 3. As illustrated in FIG. 3, a tufted carpet 300 is a composite structure which includes yarn 320 (which is also known as a fiber bundle), a primary backing material 310 having a face surface 312 and a back surface 314, an adhesive backing material 330 and, optionally, a secondary backing material 340. To form the face surface of tufted carpet, the yarn is tufted through the primary backing material such that the longer length of each stitch extends through the face surface of the primary backing material.

The face of a tufted carpet can generally be made in three ways. First, for loop pile carpet, the yarn loops formed in the tufting process are left intact. Second, for cut pile carpet, the yarn loops are cut, either during tufting or after, to produce a pile of single yarn ends instead of loops. Third, some carpet styles include both loop and cut pile. One variety of this hybrid is referred to as tip-sheared carpet where loops of differing lengths are tufted followed by shearing the carpet at a height so as to produce a mix of uncut, partially cut, and completely cut loops. Alternatively, a loop-cut-loop pattern tufting machine can be used so as to cut only some of the loops, thereby leaving a pattern of cut and uncut loops. Whether loop, cut, or a hybrid, the yarn on the back side of the primary backing material comprises tight, unextended loops.

As noted above, the combination of tufted yarn and a primary backing material without the application of an adhesive backing material or secondary backing material is referred to in the carpet industry as raw tufted carpet or greige goods. The greige goods become finished tufted carpet with the application of an adhesive backing material and an optional secondary backing material to the back side of the primary backing material. Finished tufted carpet can be prepared as broad-loomed carpet in rolls typically 6 or 12 feet wide. Alternatively, carpet can be prepared as carpet tiles, which are, for example and without limitation, 18 inches square, 24 inches square, 36 inches square, 50 cm, and 60 cm square.

The adhesive backing composition 330 can be applied to the back face of the primary backing material to affix the yarn to the primary backing material. In one aspect, the adhesive backing substantially encapsulates a portion of the back stitching of the yarn, penetrates the yarn, and binds individual carpet fibers. Properly applied adhesive backing materials do not substantially pass through the primary backing material. According to aspects of the invention, the adhesive backing composition can comprise the calcium carbonate containing mineral filler composition of the present invention as described previously herein. To that end, the calcium carbonate containing mineral filler composition can be present, for example, in an amount between about 10 weight percent to about 90 weight percent of the total adhesive backing composition, including exemplarily amounts of about 15 weight percent, 20 weight percent, 25 weight percent, 30 weight percent, 35 weight percent, 40 weight percent, 45 weight percent, 50 weight percent, 55 weight percent, 60 weight percent, 65 weight percent, 70 weight percent, 75 weight percent, 80 weight percent, and 85 weight percent of the total composition. Still further, the calcium carbonate filler composition disclosed herein can be present in any amount within a range derived from the above values. For example, the calcium carbonate filler composition can be present in an amount from about 25 weight percent to about 80 weight percent of the total composition, 30 weight percent to about 70 weight percent of the total composition, or even 40 weight percent to about 65 weight percent of the total composition.

The adhesive backing composition can also optionally comprise one or more addition fillers, including for example, mined calcium carbonate, calcium sulfate, calcium silicate, mined magnesium carbonate, magnesium oxide, magnesium hydroxide aluminum trihydrate, alumina, hydrated alumina, aluminum silicate, barium sulfate, barite, fly ash, glass cullet, glass fiber and powder, metal powder, clay, silica or glass, fumed silica, talc, carbon black or graphite, fly ash, cement dust, feldspar, nepheline, zinc oxide, titanium dioxide, titanates, glass microspheres, chalk, and mixtures thereof. Still further, the adhesive composition comprises ignition resistant fillers. Exemplary ignition resistant fillers can comprise antimony oxide, decabromobiphenyl oxide, alumina trihydrate, magnesium hydroxide, borates, and halogenated compounds.

To form the adhesive backing composition 330, a desired amount of the calcium carbonate filler composition is blended with a thermoresponsive (e.g., a thermoplastic or a thermoset) composition. In one aspect, the adhesive backing composition is comprised of a thermoresponsive polymer component wherein at least 70 weight percent of the polymer component is comprises of a homogenously branched ethylene polymer characterized as having a short chain branching distribution index (SCDBI) of greater than or equal to 50%. In a further aspect, the polymer can be a substantially linear ethylene and homogeneously branched linear ethylene polymer.

In a still further aspect, when the adhesive backing composition comprises substantially linear ethylene polymers and homogeneously branched linear ethylene polymers, a relatively low flexural modulus of these can offer advantages in ease of carpet installation and general carpet handling. In this aspect, the substantially linear ethylene polymers, in particular, show enhanced mechanical adhesion to polypropylene when employed as an adhesive backing material, which improves the consolidation and delamination resistance of the various carpet layers and components, i.e., polypropylene fibers, fiber bundles, the primary backing material, the adhesive backing material and the secondary backing material when optionally applied. Consequently, in this exemplary aspect, exceptionally good abrasion resistance and tuft bind strength can be obtained. As one skilled in the art will appreciate, good abrasion resistance is important in commercial carpet cleaning operations as good abrasion resistance generally improves carpet durability.

Operationally, the use of the preferred substantially linear ethylene polymers and homogeneously branched linear ethylene polymers as a component of the first backing composition (i.e. the adhesive), can allow for the elimination of optional secondary backing materials and as such can result in significant manufacturing cost savings. In addition, carpets adhesively backed with the preferred polymer adhesive can provide a substantial fluid and particle barrier which enhances the hygienic properties of carpet.

In a further aspect, the preferred homogeneously branched ethylene polymers used in the present invention can be characterized by a single DSC melting peak. In this aspect, the single melting peak can be determined using a differential scanning calorimeter standardized with indium and deionized water. The exemplary method involves 5-7 mg sample sizes, a "first heat" to about 140° C. which is held for 4 minutes, a cool down at 10° C./min to −30° C. which is held for 3 minutes, and heat up at 10° C./min. to 150° C. for the "second heat". The single melting peak is taken from the "second heat" heat flow vs. temperature curve. Total heat of fusion of the polymer is calculated from the area under the curve.

Exemplary flame retardants that can be incorporated into the adhesive backing compositions of the present invention include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanonanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the adhesive compositions of the instant invention and the selection of such amount will depend, in part, upon the particular flame retardant used, as well as the desired level of flame retardance to be achieved in the second generation carpet being manufactured. Such amounts can be readily determined through no more than routine experimentation.

As noted above and shown in FIG. 3, the carpet of the invention can also include an optional secondary backing material. The secondary backing material can be laminated directly to an extruded adhesive backing layer(s) while the extrudate is still molten after extrusion coating. It has been found that this technique can improve the penetration of the extrusion coating into the primary backing.

Alternatively, the secondary backing material can be laminated in a later step by reheating and/or remelting at least the outermost portion of the extruded layer or by a coextrusion coating technique using at least two dedicated extruders. Also, the secondary backing material can be laminated through some other means, such as by interposing a layer of a polymeric adhesive material between the adhesive backing material and the secondary backing material. Suitable polymeric adhesive materials include, but are not limited to, ethylene acrylic acid (EAA) copolymers, ionomers and maleic anhydride grafted polyethylene compositions.

The material for the secondary backing material can be a conventional material such as the woven polypropylene fabric sold by Propex, Inc. under the designation Action Bac®. This material is a leno weave with polypropylene monofilaments running in one direction and polypropylene yarn running in the other. A suitable example of such a material is sold by Propex, Inc. under the designation Style 3870. This material has a basis weight of about 2 OSY. In another aspect, the secondary backing material used with the present invention can be a woven polypropylene fabric with monofilaments running in both directions.

Alternatively, the secondary backing material can be a non-woven fabric. Several types are available, including, but not limited to, needle punched, spun-bond, wet-laid, melt-blown, hydraentangled, and air entangled. In one aspect, it is preferred that the secondary backing is made from a polyolefin to facilitate recycling. For example, the non-woven fabric can be spun-bond polypropylene fabric. Typically, spun-bond fabric is made from extruded and air-drawn polymer filaments which are laid down together and then point bonded, for example by a heated calendar roll. The basis weight of such a spun-bond secondary backing can be varied, preferably between 35 and 83 grams/m$^2$ (gsm) more preferably between 60 and 83 gsm. Most preferably, the basis weight is 77-83 gsm (e.g., 80 gsm). One factor favoring a higher basis weight for the spun-bond fabric is that the higher basis weight fabric is less likely to be melted when brought into contact with the molten extruded backing. In another example, it is preferred to use a needle punched non-woven secondary backing. An exemplary polypropylene non-woven needle punched secondary backing material is available from Propex, Inc. under the designation style number 9001641, having a basis weight of about 3.5 OSY.

In still another aspect, the secondary backing can be a woven needle punched polypropylene fabric such as Soft-Bac® manufactured by Shaw Industries, Inc. In this exemplary aspect, this material has been enhanced by having about 1.5 OSY of polypropylene fibers or polyethylene terephthalate fibers needle punched onto one side of it and has a total basis weight of about 3.5 OSY. This needle punched fabric is laminated so as to have the polypropylene fibers embedded within the adhesive backing layer. As a result, the strands of the woven polypropylene fabric are exposed. The needle punching can also help prevent scratching of an underlying substrate surface. This embodiment has been shown to have improved glue down properties as compared to an embodiment without the needle punched fibers because, without the needle punched fibers, the strands of the woven polypropylene fabric are at least partially embedded in the adhesive backing layer. As such, the surface area for gluing is reduced. It was also noted that the back of the carpet made in this embodiment was much less abrasive than that found with traditional latex backed carpet. The carpet is also more flexible than traditional latex backed carpet. Consequently, this embodiment is preferred for making areas rugs and the like. Still other materials can be used for the secondary backing. For example, if an integral pad is desired, polyurethane foam or other cushion material can be laminated to the back side of the carpet. Such backings can be used for broadloom carpet as well as for carpet tile.

In a further aspect of the present invention, a face fabric is provided. The face fabric can be either a tufted greige good, a fusion bonded material or a woven and needle punched material. Whether a tufted greige good, a fusion bonded or a woven and needle punched face fabric is used, the carpet fibers can comprise face yarns may be made from synthetic fibers such as, for example and without limitation, nylon, polyolefins, polyamides, acrylics, polyesters, polyethylene terephthalate (PET), polyethylene, polypropylene, and polytrimethylene terephthalate (PTT). Still further, the face yarns can be comprised of natural fibers such as staple rayon fibers, cellulose fibers, cotton fibers, wool fibers, viscose, and combinations thereof. In a particularly preferred aspect, the face yarns are comprised of polypropylene. In another preferred aspect, the face yarns are comprised of nylon fibers.

To prepare a greige good, a yarn is tufted, woven or needle punched into a primary backing. The tufting, weaving or needle punching can be conducted in any manner known to be suitable to one of ordinary skill in the art which will not be discussed in detail herein. To fix the yarn to the primary backing, an adhesive material is applied to the back of the fabric. In one aspect of the present invention, the adhesive material applied to the back side of the fabric is comprised of a recycled adhesive backing composition as described herein. However, in an alternative aspect, and as described in more detail below, a pre-coat layer can first be applied to the backside of the fabric in order to fix the yarn to the primary backing prior to applying the recycled adhesive backing material of the present invention.

In the present invention, a woven or a non-woven primary backing material can be used. The type of primary backing desired will depend on various factors including, but not limited to, whether broadloom carpet, carpet tile, or an area rug is being made, the desired end-use for the product (e.g., commercial or residential), the type of face yarn used and the price of the product. One example of a suitable woven primary backing is 24×18 woven primary, style no. 2218 from Propex, Inc. One example of a suitable non-woven backing material is Colbond UMT 135, manufactured by Colbond, Enka, N.C. Other types of primary backings are also suitable for use herein such as, for example, hydraentangled fibers and fiberglass.

A fusion bonded face fabric is characterized by a plurality of cut pile yarns, for example, nylon or other natural or synthetic fibrous-type material, implanted in an adhesive layer, particularly a thermoplastic, like a polyvinyl chloride layer or a hot-melt adhesive layer. Where a polyvinyl chloride plastisol layer is used, heating of the layer gels and then fuses the layer into solid form, while with hot-melt adhesive material, a melted layer is applied and subsequently cooled into solid form. The plurality of fibrous yarns are bonded to and extend upright from the adhesive base layer to form a face wear surface. Methods of making fusion bonded face goods are known and described, for example, in U.S. Pat. No. 6,089,007, the disclosure of which is incorporated in its entirety by this reference.

In another aspect, any conventional tufting or needle-punching apparatus and/or stitch patterns can be used in the carpet of the present invention. Likewise, it does not matter whether tufted yarn loops are left uncut to produce a loop pile; cut to make cut pile; or cut, partially cut and uncut to make a face texture known as tip sheared. After the yarn is tufted or needle-punched into the primary backing material, the greige good can be conventionally rolled up with the back side of the primary backing material facing outward and held until it is transferred to the backing line.

In one exemplary embodiment, the greige good can be scoured or washed before it has an adhesive backing material extruded thereon to remove or displace all or substantially all of the processing materials, such as for example oily or waxy chemicals, known as spin-finish chemicals, that remain on the yarn from the yarn manufacturing processes. It is also contemplated that the use of polyolefin waxes (rather than conventional organic and mineral oils) as processing materials would allow improved adhesive backing material performance in itself or at least minimize the use of scouring or washing methodologies.

In a further aspect, the primary backing can comprise nylon, polypropylene, polyethylene, polyester, acrylics, polyamide, fiberglass, wool, cotton, rayon, and combinations thereof. In a still aspect, the primary backing consists essentially of a polypropylene material.

After treatment with the optional pre-coat emulsion of polyolefin particles, additional backing material can be applied thereto. The additional backings can be applied by various methods with the preferred method involving the use of an extruded sheet of a thermoplastic material, preferably the recycled adhesive backing composition as described above, onto which a conventional secondary backing can also be laminated. In particular, a molten thermoplastic material is preferably extruded through a die so as to make a sheet which is as wide as the carpet. The molten, extruded sheet is applied to the back side of the primary carpet backing. Since the sheet is molten, the sheet will conform to the shape of the loops of yarn and further serve to encapsulate and fix the loops in the primary backing. In aspects where a pre coat has been applied to the back side of the greige good, it will be understood that the pre-coat is disposed between the adhesive backing composition and the back side of the greige good. Alternatively, according to aspects where the optional pre coat layer is not applied, the recycled adhesive backing composition of the present invention is applied directly on the back side of the primary backing and can, itself, serve to fix the loops in the primary backing.

Exemplary extrusion coating configurations can include, without limitation, a monolayer T-type die, single-lip die coextrusion coating, dual-lip die coextrusion coating, a coat hanger die, and multiple stage extrusion coating. Preferably, the extrusion coating equipment is configured to apply a total coating weight of from about 4 to about 60 ounces/yd$^2$ (OSY), including exemplary amounts of 5, 10, 15, 20, 25, 30, 35, 40, 45, 50 and 55 ounces/yd$^2$ (OSY), and any range of coating weights derived from these values. To that end, it should be understood that the desired coating weight of the extrusion coated layers will depend, at least in part, upon the amount of any flame retardants or mineral fillers in the extrudate.

The extrusion coating melt temperature principally depends on the particular composition of the adhesive backing composition being extruded. When using the recycled adhesive backing composition described above, comprising the preferred substantially linear polyethylene described above, the extrusion coating melt temperature can be greater than about 350° F. and, in some aspects, in the range of from 350° F. to 650° F. In another aspect, the melt temperature can be in the range of from 375° F. to 600° F. Alternatively, the melt temperature can be in the range of from 400° F. to 550° F. Still further, in aspects of the invention the melt temperature can be in the range of from 425° F. to 500° F.

Figure 4:
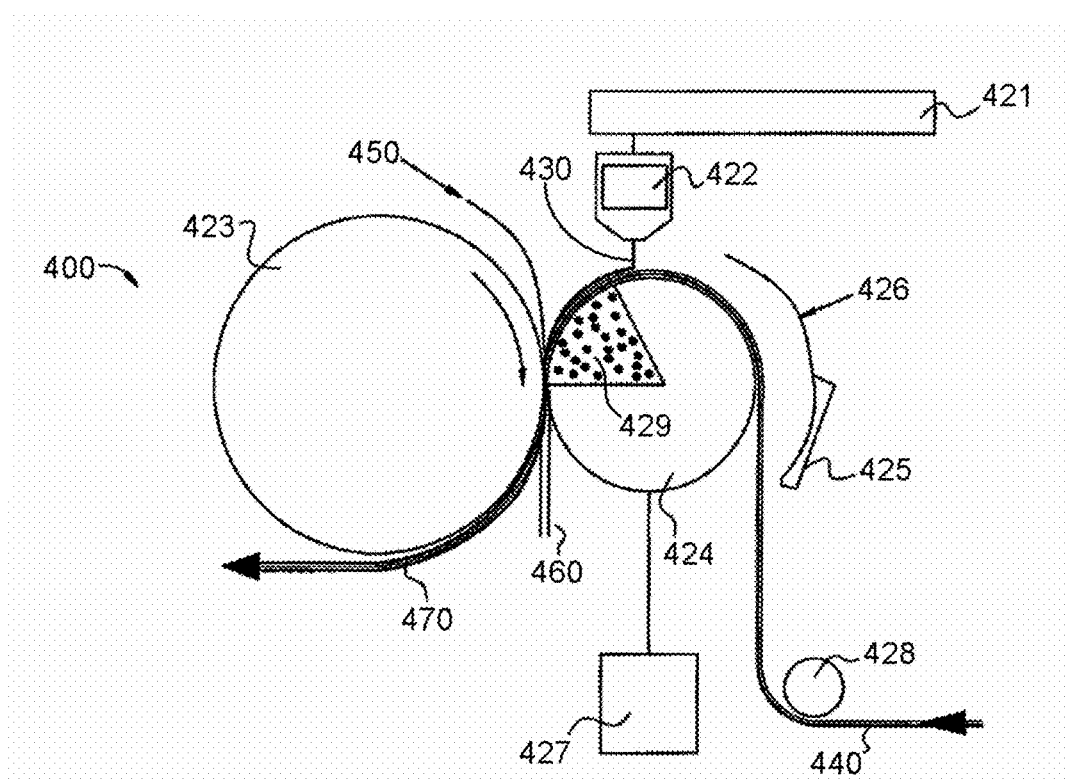
FIG. 4 shows a schematic representation of an exemplary extrusion coating line according to one aspect of the invention.

FIG. 4 shows an exemplary line 400 for applying a first backing composition (e.g., an adhesive backing composition) as described herein to the bottom surface of a greige good to provide an adhesive backed carpet 470. As shown, the line 400 includes an extruder 421 equipped with a slot die 422, a nip roll 424, a chill roll 423, an exhaust hood 426, a turn roll 428 and a pre-heater 425. As illustrated, the nip roll is preferably equipped with a vacuum slot 429 to draw a vacuum across about a portion of its circumference and is configured in communication with a vacuum pump 427. The slot die 422 is configured to dispense the recycled adhesive backing material in the form of a semi-molten or molten polymer sheet 430 onto greige good 440 with the polymer sheet 330 being oriented towards the chill roll 423 and the greige good 440 being oriented towards the optional vacuum nip roll 424. As further illustrated, an optional secondary backing material 450 can be applied onto the polymer sheet 430. The point where the nip roll 424 and the chill roll 423 are closest to one another is referred to as the nip 460.

Figure 5:
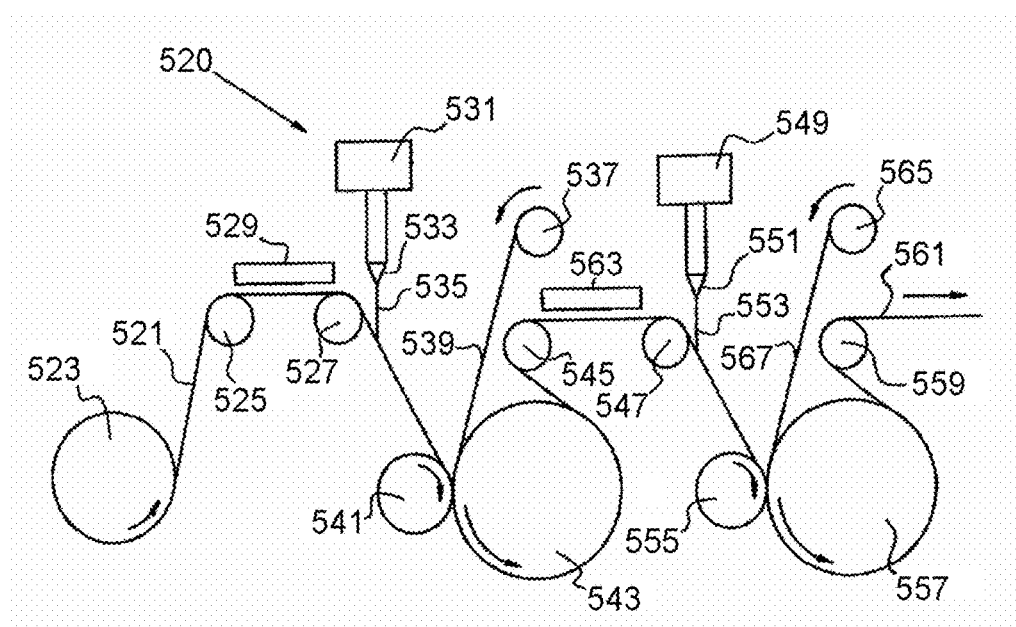
FIG. 5 shows a schematic representation of an exemplary extrusion coating line according to an aspect of the invention.

For example, FIG. 5 schematically shows an exemplary line 520 for manufacturing a carpet according to aspects of the present invention. As shown, a length of greige good 521, i.e., a plurality of carpet fibers tufted into a primary backing, is unrolled from the roll 523. The greige good 521 passes over the rollers 525 and 527 with the primary backing toward a pre-heater 529. The pre-heater, such as a convection oven or infrared panels, can be used to heat the bottom surface of the greige good before the adhesive backing material is extruded thereon to enhance the encapsulation and penetration of the yarn bundles. In addition to or as an alternative to pre-heating, the process of the invention may also employ a post-heat soaking process step to lengthen the molten time for the adhesive backing material to thereby improve the encapsulation and penetration of the yarn or fiber bundles by the adhesive backing material.

An extruder 531 is mounted so as to extrude a first sheet 535 of the first backing composition through the die 533 and onto the bottom surface of the greige good at a point between the roller 527 and the nip roll 541. The exact location at which the sheet 535 contacts the greige good can be varied depending on the line speed and the time desired for the molten polymer to rest on the greige good before passing between the nip roll 541 and the chill roll 543. In this depicted embodiment, a scrim of non-woven fiberglass 539 can be fed from roll 537 so as to contact the chill roll 543 at a point just prior to the nip roll 541. As a result, the scrim 539 that will act as a reinforcing fabric in the finished carpet is laminated to the greige good through the polymer.

The desired pressure between the nip roll 541 and the chill roll 543, measured in pounds per linear inch (PLI) can be varied depending on the force desired to push the extruded sheet. In particular, this desired pressure can be adjusted by varying the pressure within the air cylinders. Alternatively, the nip roll 541 and chill roll 543 can be operated in a gap mode whereby the spacing between the two rolls can be adjusted to a desired gap width, depending for example on the thickness of the material being passed there between. Also, as described in connection with FIG. 4, it may be desirable to include a vacuum slot in the nip roll. In addition, a jet of pressurized air may also be used to push the extruded sheet into the carpet backing. Still further, the size of the chill roll 543 and the length of time the carpet rolls against it can be varied depending on the level of cooling desired in the process. Preferably, the chill roll 543 is cooled by simply passing ambient or chilled water through it.

After passing over the chill roll 543, the carpet is brought over rollers 545 and 547 with the carpet pile oriented toward the rollers and the backside of the carpet, having a first layer of adhesive 535 and a scrim 539 laminated thereto oriented toward a second pre-heater 563. A second extruder 549 extrudes a second sheet of a recycled adhesive backing composition 553 through its die 551 on to the back of the scrim 539. Again the point at which the extruded sheet 553 contacts the scrim 539 can be varied as described above.

At this point, if an optional secondary backing fabric 567 is desired for the carpet composition, that fabric can be introduced from a second roll 565 similar to that shown at 537 so as to be laminated to the carpet through the extruded sheet 553 as it passes between the nip roll 555 and the chill roll 557. Subsequently, the carpet passes between the nip roll 555 and the chill roll 557. Again, the pressure applied between the two rolls 555 and 557 can be varied as required. Finally, after passing around the chill roll 557, the finished carpet 561 passes around roll 559 and is preferably passed over an embossing roll (not shown) to print a desired pattern on the back of the carpet.

As noted above, the carpet of the invention can optionally include a secondary backing material. As shown in FIG. 4 and FIG. 5, the secondary backing material is preferably laminated directly to the extruded layer(s) while the extrudate is still molten after extrusion coating to improve the penetration of the extrusion coating into the primary backing. Alternatively, the secondary backing material can be laminated in a later step by reheating and/or remelting at least the outermost portion of the extruded layer or by a coextrusion coating technique using at least two dedicated extruders. Also, the secondary backing material can be laminated through some other conventional means, such as by interposing a layer of a polymeric adhesive material between the adhesive backing material and the secondary backing material. Suitable polymeric adhesive materials include, but are not limited to, ethylene acrylic acid (EAA) copolymers, ionomers and maleic anhydride grafted polyethylene compositions. The secondary backing material can be woven or non-woven and can further be comprised of one or more polyethylene polymers such as, for example and without limitation, a low density polyethylene (LDPE), heterogeneously branched linear low density polyethylene (LLDPE), high density polyethylene (HDPE), heterogeneously branched ultra low density polyethylene (ULDPE), heterogeneously branched very low density polyethylene (VLDPE), heterogeneously branched linear low density polyethylene (LLDPE), heterogeneously branched linear very low density polyethylene (VLLDPE), a copolymer of ethylene and alpha olefin, polypropylene, a copolymer of propylene and alpha olefin, a copolymer of propylene and ethylene, ethylene vinyl acetate copolymer (EVA), ethylene methyl acrylate copolymer (EMA), grafted polyethylene polymers (e.g., a maleic anhydride extrusion grafted heterogeneously branched linear low polyethylene or a maleic anhydride extrusion grafted homogeneously branched ultra low density polyethylene), ethylene acrylic acid copolymer, ethylene ethyl acrylate copolymer, polystyrene, polyolefin, polyester, polyurethane, polybutylene, polyamide, polycarbonate, rubbers, ethylene propylene polymers, ethylene styrene polymers, styrene block copolymers, and vulcanates.

Figure 6:
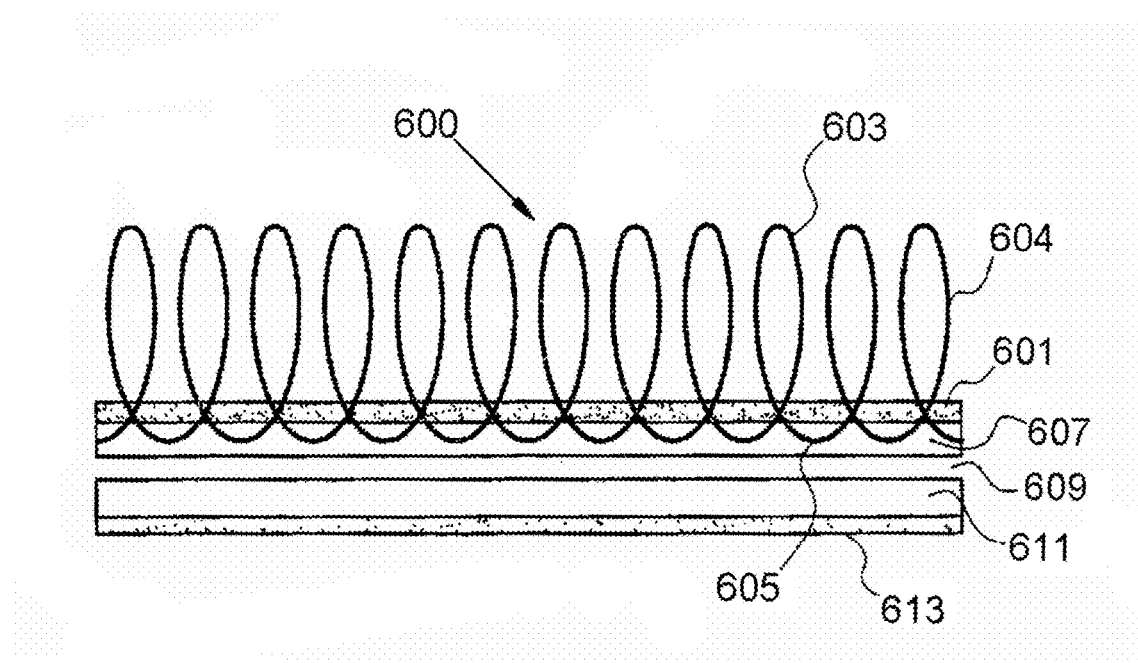
FIG. 6 shows an illustration of an exemplary tufted carpet.

In still another aspect, the extrusion backed carpet construction and the methods described herein are particularly suited for making carpet tile. FIG. 6 shows an exemplary cross-section of a carpet tile 600 made according to the present invention. A face yarn 603 is tufted into a primary backing 601 so as to leave a carpet pile face 604 on top of the primary backing 601 and back stitches 605 below the primary backing. Applied to the back of the primary backing 601 and the back stitches 605 is a recycled adhesive composition layer 607 comprising at least one recycled polyolefin polymer component reclaimed from a process as described herein. In a preferred embodiment of carpet tile, the carpet includes from about 5 to about 200 OSY of extruded adhesive backing. More preferably, the carpet for tile includes from about 30 to about 80 OSY of extruded backing, most preferably, 50 OSY.

Preferably, the carpet tile receives its extruded adhesive backing in two passes as exemplified in FIG. 6 discussed above. The first pass applies the layer 607. Preferably this layer 607 is between about 2.5 and about 100 OSY of the extruded polymer, more preferably between about 15 and about 40 OSY, and most preferably 25 OSY. The second pass adds the layer 611. Preferably the second layer 611 is about 2.5 and about 100 OSY, more preferably between about 15 and 40 OSY, and most preferably 25 OSY.

When, for example, making carpet tile, it can again be preferable to embed a layer of reinforcing material 609 between the first and second layers of extruding backing. An important property of carpet tile is dimensional stability, i.e., the ability of the tile to maintain its size and flatness over time. The inclusion of this layer of reinforcing material has been found to enhance the dimensional stability of carpet tile made according to this preferred embodiment. Suitable reinforcing materials include dimensionally and thermally stable fabrics such as non-woven or wet-laid fiberglass scrims, as well as woven and non-woven thermoplastic fabrics (e.g. polypropylene, nylon and polyester). Most preferably, the reinforcement layer is a polypropylene non-woven fabric sold by Reemay as "Typar" with a basis weight of 3.5 OSY. Alternatively, a preferred reinforcement layer is a fiberglass scrim sold by ELK Corp. as "Ultra-Mat" with a basis weight of 1.4 OSY.

The carpet tile may also include a secondary backing fabric 613 below the second layer of extruded backing 611. Suitable materials for the secondary backing fabric include those described above.

One skilled in the art will appreciate that, notwithstanding the particular examples described above, it is contemplated that the carpet may be produced by the processes known to those skilled in the art, including but not limited to direct coating and roll metering, and knife-coating and lick-roll application, as described in D. C. Blackly, *Latex and Textiles*, section 19.4.2, page 361, which is incorporated herein by reference.

As will be appreciated by one of ordinary skill in the art, tensile strength and elongation at the breaking point are important performance properties of a carpet or a carpet tile. In one aspect, the carpet comprising an inventive miner composition demonstrates improvements in both tensile strength and elongation at the breaking point.

For example, a carpet or carpet tile comprising the disclosed mineral filler composition in an applied precoat composition can exhibit tensile strength values at least 2% higher than identical carpet or carpet tile comprising the conventional mined $CaCO_3$ filler. In a further aspect, the exhibited tensile strength values are at least 5%, 10%, 15%, 20%, 25%, 30%, 35%, 40%, 45% or at least 50% higher than the tensile strength values of the carpet or carpet tile comprising the conventional mined filler.

Still further, a carpet or carpet tile comprising the disclosed mineral filler composition in an applied precoat composition can exhibit the elongation at the breaking point values at least 2% higher than identical carpet or carpet tile comprising the conventional mined $CaCO_3$ filler. In a further aspect, the exhibited elongation at the breaking point values are at least 5%, 10%, 20%, 50%, 100%, 150%, 200%, or at least 300% higher than the elongation at the breaking point values of the carpet or carpet tile comprising the conventional mined filler.

EXAMPLES

The following examples are put forth so as to provide those of ordinary skill in the art with a complete disclosure and description of how the mineral filler compositions disclosed herein can be obtained, utilized, and evaluated. These examples are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Manufacture of Mineral Filler Composition

Raw egg shells were obtained from Almark Foods of Gainesville, Ga. The shell waste was heated at 500° C. in an oxidizing atmosphere (air) to remove essentially all moisture from the shell. The heat treated material was then subjected to a size reduction step to provide a particulate material having an approximate particle size distribution whereby approximately 100% of the particles pass through the 200 mesh screen and 50% of the particles pass through the 325 mesh screen. The shell particles, further were heated at about 550° C. for a duration of about 4 hours to remove all complex organic compounds, including shell membranes, residual egg liquids and solids to produce odor free material. Oyster shells were treated similarly to egg shells to prepare the inventive filler composition.

Manufacture and Evaluation of Latex Precoat Compositions

A first set of exemplary latex precoat compositions were prepared according to the formulations set forth in Table 1 below. A control sample C1 was prepared according to standard procedures, and contained conventional mined calcium carbonate as a mineral filler. As shown, inventive compositions Example 1 and Example 2 were prepared having a similar amount of Latex as in the control sample C1, and contained inventive filler composition obtained from oyster shells and egg shells, respectively, as a mineral filler. Comparisons were made to determine whether any significant impact in viscosity occurred when utilizing the inventive filler compositions. As shown in Table 1, the viscosity of compositions Example 1 and Example 2 were 11,800 cps and 11,200 cps, respectively, while the viscosity of control sample C1 was 12,000 cps. Though the viscosities of the inventive compositions were slightly lower, this was not viewed as a significant change and was still within the desired target range of 11,000 to 12,000 cps for latex precoat compositions.

The exemplified latex used herein is Styrofan NX 4628 provided by BASF. As one of ordinary skill in the art can appreciate, Styrofan NX 4628 styrene-butadiene latex is specifically design to incorporate nontraditional fillers and additives into carpet backing systems.

TABLE 1

| Sample | C1 | Ex. 1 | Ex. 2 |
| --- | --- | --- | --- |
| Latex | 4628 | 4628 | 4628 |
| Froth Aid-SF180 (gr) | 4.5 | 5.2 | 4.0 |
| Froth Aid-CB10 (gr) | 1.8 | 1.8 | 4.1 |
| Viscosity after addition of the filler (cps) | 1200 | 2000 | 4400 |
| Viscosity after addition of froth aids (cps) | 1000 | 1650 | 3500 |
| Thickener (gr) | 4.0 | 3.0 | 2.1 |
| Cpd Viscosity (cps) | 12,000 | 11,800 | 11,200 |
| 24 hr build Viscosity (cps) | 14,600 | 14,200 | 11,700 |
| 48 hr build Viscosity (cps) | 15,600 | 14,300 | 12,400 |
| Wet foam density (cup weight) (g/l) | 86.04 | 88.12 | 85.14 |
| Froth viscosity (cps) | 16,750 | 16,500 | 15,750 |

A second set of exemplary latex precoat compositions were prepared according to the formulations set forth in Table 2 below. Three samples were prepared: a control sample C2, and two inventive compositions Example 3 and Example 4. The amount of each formulation in the compositions has been kept constant for all three samples, wherein the control sample, C2 contained conventional mined calcium carbonate as a mineral filler, and inventive compositions Example 3 and Example 4 contained inventive filler composition obtained from oyster shells and egg shells, respectively. Comparisons were made to determine whether any significant impact in viscosity occurred when utilizing the inventive filler compositions, and the results are disclosed in Table 2.

TABLE 2

| Sample | C2 | Ex. 3 | Ex. 4 |
|---|---|---|---|
| Latex | 4628 | 4628 | 4628 |
| Froth Aid-SF180 (gr) | 4.5 | 4.5 | 4.5 |
| Froth Aid CB10 (gr) | 1.8 | 1.8 | 1.8 |
| Viscosity after addition of the filler (cps) | 1200 | 1900 | 3800 |
| Viscosity after addition of froth aid (cps) | 1000 | 1550 | 3100 |
| Thickener (gr) | 3.3 | 3.3 | 3.3 |
| Cpd Viscosity (cps) | 7500 | 8800 | 15,500 |
| Wet foam density (cup weight) (g/l) | 85.55 | 87.33 | 77.06 |
| Froth viscosity (cps) | 13,250 | 15,500 | 15,500 |

Evaluation of Tensile Strength and Elongation at the Breaking Point

An exemplary precoat composition, Example 5, was prepared according to methods known to one of ordinary skill in the art, wherein conventionally mined calcium carbonate used as a mineral filler has been replaced with the inventive filler composition obtained from egg shells. Example 5 was tested to evaluate the changes in the tensile strength and elongation at the breaking point as compared to a control sample C3 similarly prepared and containing conventional mined calcium carbonate as a mineral filler. The results are described herein and in Table 3 below. Specifically, it was determined that the precoat composition containing the inventive filler composition demonstrated a significantly higher tensile strength and elongation at the breaking point as compared to the control sample. As can be seen in Table 3, the tensile strength of the precoat composition containing the inventive filler composition is about 15% higher than the tensile strength of the control. Furthermore, the elongation at the breaking point of the precoat composition containing inventive filler is at least 300% higher than the elongation at the breaking point of the control composition.

TABLE 3

| Sample | Elongation at Max Load, % | Tensile strength, lb/sq in | Elongation at break, % | Toughness |
|---|---|---|---|---|
| C3 | 3.13 ± 0.61 | 280.65 ± 31.21 | 3.56 ± 0.65 | 7.56 ± 2.14 |
| Ex. 5 | 11.31 ± 1.54 | 321.72 ± 14.65 | 14.50 ± 2.62 | 40.63 ± 8.74 |

Evaluation of Mineral Content

The calcium and magnesium mineral content of inventive mineral filler composition prepared from calcined egg shells heat treated at a temperature of 500° C. for 4 hours as described herein was measured and compared to the calcium and magnesium mineral content of a conventional calcium carbonate filler prepared from mined rock. The results are described herein and in Table 4 below.

TABLE 4

| Element | Mined rock (µg/g) | Egg shells (µg/g) |
|---|---|---|
| Calcium | 326900 | 341000 |
| Magnesium | 65700 | 3241 |
| Total quantifiable | 403613 | 345085 |
| Ca/total | 0.81 | 0.99 |
| (Ca + Mg)/total | 0.97 | 1.0 |

Specifically, it was determined that the ratio of Ca to Mg in the mineral filler composition prepared from the egg shells is 105:1 wherein the ratio of Ca to Mg in the conventional mineral filler prepared from a mined rock is 5:1. Without wishing to be bound by any theory, it is believed that the difference in a mineral composition in the mineral filler composition prepared from different sources can be responsible for the improved filler properties described herein. It was found that Ca content accounts for 99 weight % of the quantifiable metal composition in the eggs shells compared to 81 weight % in mined rock. Mg content in mined rock accounts for 16 weight % of quantifiable metal composition.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for making a mineral filler composition, comprising the steps of
    a) providing a renewable biological calcium carbonate source, wherein the renewable biological calcium carbonate source comprises at least one of egg shells, oyster shells, and mollusk shells;
    b) heat treating the renewable biological calcium carbonate source under conditions effective to remove residual organic material; and
    c) size reducing the heat treated renewable biological calcium carbonate source to provide a particulate mineral filler composition having a predetermined particle size distribution;
    wherein the mineral filler composition has a total quantifiable metal composition and
    wherein at least 85 weight % of the total quantifiable metal composition is calcium.

2. The method of claim 1, wherein at least 90 weight % of the total quantifiable metal composition is calcium.

3. The method of claim 1, wherein at least 95 weight % of the total quantifiable metal composition is calcium.

4. The method of claim 1, wherein a slurry of the particulate mineral filler composition in water has a pH less than or equal to about 10.

5. The method of claim 1, wherein the predetermined particle size distribution is characterized by a $D_{(100)}$ less than 74 microns and $D_{(50)}$ less than 44 microns.

6. The method of claim 1, wherein the predetermined particle size distribution is characterized by a median particle size $D_{(50)}$ in the range of from 7 to 11 microns.

7. The method of claim 1, wherein the composition is free of magnesium.

8. The method of claim 1, further comprising forming a raw slurry of the renewable biological calcium carbonate source in water before step b) and homogenizing the raw slurry to provide a substantially uniform particle size.

9. The method of claim 8, further comprising drying the homogenized raw slurry to at least substantially remove water.

10. The method of claim 1, wherein the conditions effective to remove residual organic material comprise heating treating the renewable biological calcium carbonate source at a temperature of at least 500 degrees C.

11. The method of claim 1, wherein the conditions effective to remove residual organic material comprise heating treating the renewable biological calcium carbonate source at a temperature of at least 600 degrees C.

12. The method of claim 1, wherein the conditions effective to remove residual organic material comprise heating treating the renewable biological calcium carbonate source at a temperature of at least 700 degrees C.

13. The method of claim 1, wherein the renewable biological calcium carbonate source comprises egg shells.

* * * * *